(12) United States Patent
Yoshioka et al.

(10) Patent No.: US 6,323,918 B1
(45) Date of Patent: Nov. 27, 2001

(54) LIQUID CRYSTAL DISPLAY DEVICE AND PROCESS FOR PRODUCTION THEREOF

(75) Inventors: Koji Yoshioka; Masafumi Itokazu; Keizo Morita; Munehiro Haraguchi; Mitsuharu Nakazawa; Hiroshi Murakami, all of Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 08/986,913

(22) Filed: Dec. 8, 1997

(30) Foreign Application Priority Data

Dec. 10, 1996 (JP) .................................................. 8-329838
Nov. 13, 1997 (JP) .................................................. 9-311904

(51) Int. Cl.[7] ........................... G02F 1/136; G02F 1/1343
(52) U.S. Cl. ................................ 349/48; 349/38; 349/43; 349/111
(58) Field of Search ................................. 349/38, 39, 42, 349/43, 48, 110, 111, 106; 257/59, 72; 345/92; 438/30

(56) References Cited

U.S. PATENT DOCUMENTS 5,847,792 * 12/1998 Kobayashi et al. .................. 349/110
5,990,988 * 11/1999 Hanihara et al. ...................... 349/48
6,034,749 * 3/2000 Sato et al. ............................ 349/110

FOREIGN PATENT DOCUMENTS 588644    4/1993   (JP) .

OTHER PUBLICATIONS

M. Itoh et al.; High Resolution Low–Temperature Poly–Si TFT–LCDs Using a Novel Structure With TFT Capacitors; May 1996; SID Int'l. Symposium Digest of Technical Papers, 1996; pp. 17–20.

* cited by examiner

Primary Examiner—William L. Sikes
Assistant Examiner—Tai V. Duong
(74) Attorney, Agent, or Firm—Greer, Burns & Crain,Ltd.

(57) ABSTRACT

A capacitor electrode is formed simultaneously with drain bus lines. This capacitor electrode is electrically connected to the contact of two TFT's through the medium of a contact hole. Then, an interlayer insulating film is formed on the entire face and a black matrix of such light blocking metal film as Ti is formed on the interlayer insulating film so as to overlie the channel parts and the contacts of the TFT's and the capacitor electrode. The capacitor electrode, the interlayer insulating film formed thereon, and the black matrix jointly form a capacitor.

15 Claims, 30 Drawing Sheets

LIQUID CRYSTAL DISPLAY DEVICE AND PROCESS FOR PRODUCTION THEREOF

BACKGROUND OF THE INVENTION

1. Field of the Invention

This invention relates to a liquid crystal display device having the structure of a multigate thin film transistor (TFT) and a process for the production thereof.

2. Description of the Prior Art

The liquid crystal display device of the active matrix type precludes the cross talk by providing the pixels existent therein severally with a switch capable of assuming an OFF state during a nonselective phase and blocking a signal and exhibits a fine display property as compared with the liquid crystal display device of the simple matrix method. Particularly, the liquid crystal display device using a TFT as a switch (hereinafter referred to as "TFT") acquires an exceptionally fine display property because the TFT possesses a high drive capacity.

Generally, the liquid crystal display device has the structure of enclosing a liquid crystal in a gap between two substrates. A counter electrode, a color filter, an alignment layer, etc. are formed on one of the mutually opposed faces of these two substrates (opposed faces) and an active matrix circuit, a pixel electrode, an alignment layer, etc. are formed on the other of the opposed faces. Polarizers are attached fast one each to the faces of the substrates opposite to the opposed faces mentioned above. These two polarizers are disposed, for example, in such a manner that the directions of polarization of the polarizers perpendicularly intersect each other. In this layout, they assume the normally white mode, i.e. the mode in which they pass light while not exposed to an electric field and they block light while exposed to an electric field. Conversely, when the directions of polarization of the two polarizers are parallel to each other, they assume the normally black mode. Hereinafter, the substrate having the TFT formed thereon will be referred to as "TFT substrate" and the substrate having the counter electrode formed thereon as "counter substrate."

FIG. 1 is a schematic diagram illustrating the conventional liquid crystal display device. A plurality of gate bus lines 54 and a plurality of drain bus lines 56 are formed on one of the opposed substrates of the liquid crystal display device such that they perpendicularly cross each other as illustrated in FIG. 1. A TFT 51 and a pixel electrode 50 are disposed in each of a plurality of rectangular areas which are defined by the gate bus lines 54 and the drain bus lines 56. The gates of the TFT 51 are connected to the gate bus lines 54, the drains thereof to the drain bus lines 56, and the sources thereof to the pixel electrodes 50.

FIG. 2 is a diagram illustrating the waveform of a voltage applied to the gate bus lines 54 and the drain bus lines 56. To the gate bus lines 54 is supplied such a signal as turns ON and OFF the pixels at a refreshing timing. In the case of the VGA (video graphics array) display (640×480 dots) of a personal computer, for example, the TFT 51 of a given pixel therein is turned ON and OFF at such a timing that the OFF state of a duration of about 16 m.seconds and the ON state of a duration of 30 $\mu$.seconds are alternately repeated.

The display of an image is attained while the TFT 51 is held in the ON state because the voltage applied to the drain bus lines 56 accumulates an electric charge in the pixel electrode 50 and the electric field generated from the pixel electrode 50 varies the inclination of liquid crystal molecules and induces a proportionate variation in the luminous energy which passes the pixels. The ON-OFF state of the TFT 51 is decided by the current-voltage characteristic (I–V characteristic).

FIG. 3 is a diagram illustrating one example of the IV–V characteristic of the TFT of a liquid crystal display device, with the horizontal axis as the scale of the gate voltage, Vg, and the vertical axis as the scale of the amount of current, Id, flowing between the drain and the source. In the diagram, the area indicated by the symbol a represents the ON state assumed by the TFT and the area by the symbol b the OFF state assumed thereby. As shown in FIG. 3, even while the TFT is held in the OFF state, the electric charge accumulated in the pixel electrode leaks and the voltage of the pixel electrode declines because a current (off current) of the order of several pA—some tens of pA flows through the TFT. This amount of decline, $\Delta V$, of the voltage assumes the relation represented by the following formula (1)

$$\Delta V = I\mathrm{off} \cdot \Delta T / C \tag{1}$$

wherein $\Delta V$ represents the amount of decline of voltage, Ioff the off current of the TFT, $\Delta T$ the duration of the OFF state of the TFT (16 m.seconds in the case mentioned above), and C the magnitude of the capacitive component between the pixel electrode and the counter electrode.

When the amount of decline, $\Delta V$, of voltage is large, the screen generates uneven display in the vertical direction and cross talk and degrades the quality of display. Various methods for diminishing the magnitude of $\Delta V$, therefore, have been proposed.

For example, a liquid crystal display device which has a capacitor $C_{12}$ connected parallelly to a capacitive component $C_{11}$ composed of a pixel electrode and a counter electrode as shown in FIG. 4 and which is designated as "additive capacitance method" or "cumulative capacitance method" has been proposed. This device is incapable of attaining the effect of diminishing the leak of electric charge unless the capacitor $C_{12}$ is endowed with a large capacity. An addition to the capacity of the capacitor $C_{12}$ has a necessary consequence of diminishing the open area ratio. Particularly when the liquid crystal display device is small and has a minute pitch for the pixels thereof, the enlargement of the capacity of the added capacitor is infeasible because it entails a marked decrease in the open area ratio.

Another liquid crystal display device of the so-called multigate TFT structure which diminishes the OFF current by having a plurality of TFT's connected in series between a train bus line and a pixel electrode has been proposed.

FIG. 5 is a top view illustrating the liquid crystal display device of the conventional multigate TFT structure.

On a glass plate (not shown), a plurality of gate bus lines 64 and a plurality of drain bus lines 66 are disposed so as to intersect perpendicularly as viewed from above. Pixel electrodes 60 made of ITO (indium tin oxide) are formed one each in the rectangular areas defined by the gate bus lines 64 and the drain bus lines 66. A black matrix 68 (indicated with slanted lines in the diagram) made of a metal film impervious to light is formed between the pixels, namely on the gate bus lines 64 and the drain bus lines 66.

Polysilicon films 62 are selectively formed on the glass sheet. The polysilicon films 62 and the gate bus lines 64 that overlie and intersect them jointly form two TFT's 61a and 61b per pixel. These TFT's 61a and 61b are connected in series between the pixel electrode 60 and the relevant drain bus lines 66.

This liquid crystal display device has an extremely small OFF current because the two TFT's 61a and 61b are connected in series between the pixel electrode 60 and the drain bus lines 66 as described above.

Yet another liquid crystal display device which has pixels each provided with a plurality of TFT's and has an additive capacitor connected to the source-drain of each of the TFT's has been proposed as a version having the OFF current of a TFT further allayed as compared with the liquid crystal display device illustrated in FIG. 5 (JP-A-05-88644, M. Itoh et al. High-Resolution Low-Temperature PolySi TFT-LCD's Using a Novel Structure with TFT Capacitors, SID International Symposium Digest of Technical Papers, p. 17–p. 20, 1996).

FIG. 6 is a top view illustrating the liquid crystal display device just mentioned and FIG. 7 is a circuit diagram of this device. This liquid crystal display device has a plurality of gate bus lines 74 and a plurality of drain bus lines 76 formed on a glass sheet (not shown) such that they perpendicularly intersect. Power source lines 75 are disposed each between two adjacent gate bus lines 74. These power source lines 75 are adapted to be retained at a fixed potential. Polysilicon films 72 are formed in a zigzag shape on the glass sheet. The polysilicon films 72 and the gate bus lines 74 overlying them jointly form three TFT's 71a, 71b, and 71c per pixel. The polysilicon films 72 and the power source lines 75 jointly form TFT's 73.

These TFT's 71a–71c and TFT's 73 are connected in series between the drain bus lines 76 and a pixel electrode 70. The TFT's 73 function as a capacitor. Specifically, the polysilicon film of the TFT 73 function as one of the electrodes of the capacitor and the gate electrode function as the other electrode.

The liquid crystal display device provided with such a structure as is described above is enabled to have the OFF current of a TFT extremely decreased.

SUMMARY OF THE INVENTION

It is an object of this invention to provide a liquid crystal display device which is prevented from the defect of short and the dispersion of capacity and which is capable of preventing the OFF current characteristic from being degraded by the use of a light source with large luminous energy and a process for the production thereof.

Another object of this invention is to provide a liquid crystal display device which is furnished with a stable capacitor and enabled to excel in display quality without requiring any addition to the process of production.

In this invention, a first electrode is connected to at least one of a plurality of thin film transistors connected between drain bus lines and a pixel electrode and this first electrode forms a capacitor in conjunction with an interlayer insulating film and a light blocking metal film impervious to light overlying the insulating film. Generally, the interlayer insulating film is formed in an amply large thickness as compared with a gate insulating film. The defect of short and the dispersion of capacity, therefore, are repressed as compared with the structure using the gate insulating film of the TFT as the dielectric of a capacitor. Further, this invention can prevent the OFF current characteristic from being degraded by the use of a light source with large luminous energy because a black matrix overlies the channel parts and mutual contacts of the plurality of thin film transistors.

In another liquid crystal display device of this invention, a first electrode made of a metal film and a second electrode made of a metal film and disposed above or below the first electrode jointly form a capacitor. This capacitor is connected to one of a plurality of serially connected thin film transistors. In this case, the first electrode can be formed in either of a layer having gate bus lines formed therein and a layer having drain bus lines formed therein and the second electrode can be formed in the other of the two layers mentioned above. As a result, the otherwise inevitable addition to the process of production can be avoided.

Further, in the case of a liquid crystal display device of the type having a TFT and a light blocking metal film (black matrix) formed on one of the opposed substrates, the first electrode can be formed of a layer having gate bus lines formed therein, a layer having drain bus lines formed therein, or a layer having the light blocking metal film formed therein and the second electrode can be formed of either of the remaining two layers.

When the pixel electrode is formed in a layer higher than the layer containing gate bus lines and the layer containing drain bus lines, an effort to connect the pixel electrode directly to the transistors tends, on account of the intervention of a plurality of insulating films therebetween, to result in increasing the depth of the contact holes and exposing the electrode to disconnection. It is, therefore, recommendable to have an intermediate electrode formed in a layer interposed between the pixel electrode and the transistors and connect the pixel electrode to the transistors through the medium of this intermediate electrode. The intermediate electrode may be formed in the same layer as the drain bus lines, in the same layer as the gate bus lines, or in the same layer as the light blocking metal film.

When the pixel electrode is connected to the transistors through the medium of the intermediate electrode formed in the same layer as the gate bus lines, the first electrode which is formed of the intermediate electrode and the second electrode which is formed in the same layer as the light blocking metal film jointly form a capacitor.

When the capacitor is formed within the area of pixels, it becomes necessary to form a wiring for retaining the electrodes of the capacitor at a prescribed potential. In order that the open area ratio may be amply large, this wiring is preferred to have a small length. Where the wiring is drawn out on the gate bus lines' side, the size of the area of the pixels is preferred to be large in the direction of length of the gate bus lines (in the horizontal direction) and to be small in the direction of length of drain bus lines (in the vertical direction) for the sake of enabling the open area ratio to be large. In this case, by causing every three vertically adjacent pixel areas to serve as one dot during color display and disposing red (R), green (G), and blue (B) color filters for each of the dots, the dots are allowed to assume a shape approximating closely to a square.

In the process for the production of the liquid crystal display device of this invention, the drain bus lines and the first electrode are formed simultaneously and a black matrix destined to overlie the gate bus lines and the drain bus lines and the second electrode to overlie the first electrode are formed simultaneously. As a result, the increase in the number of component steps of the process can be avoided and the liquid crystal display device of the multigate TFT structure endowed with an additive capacity can be easily manufactured.

DESCRIPTION OF THE PREFERRED EMBODIMENTS

Figure 1:
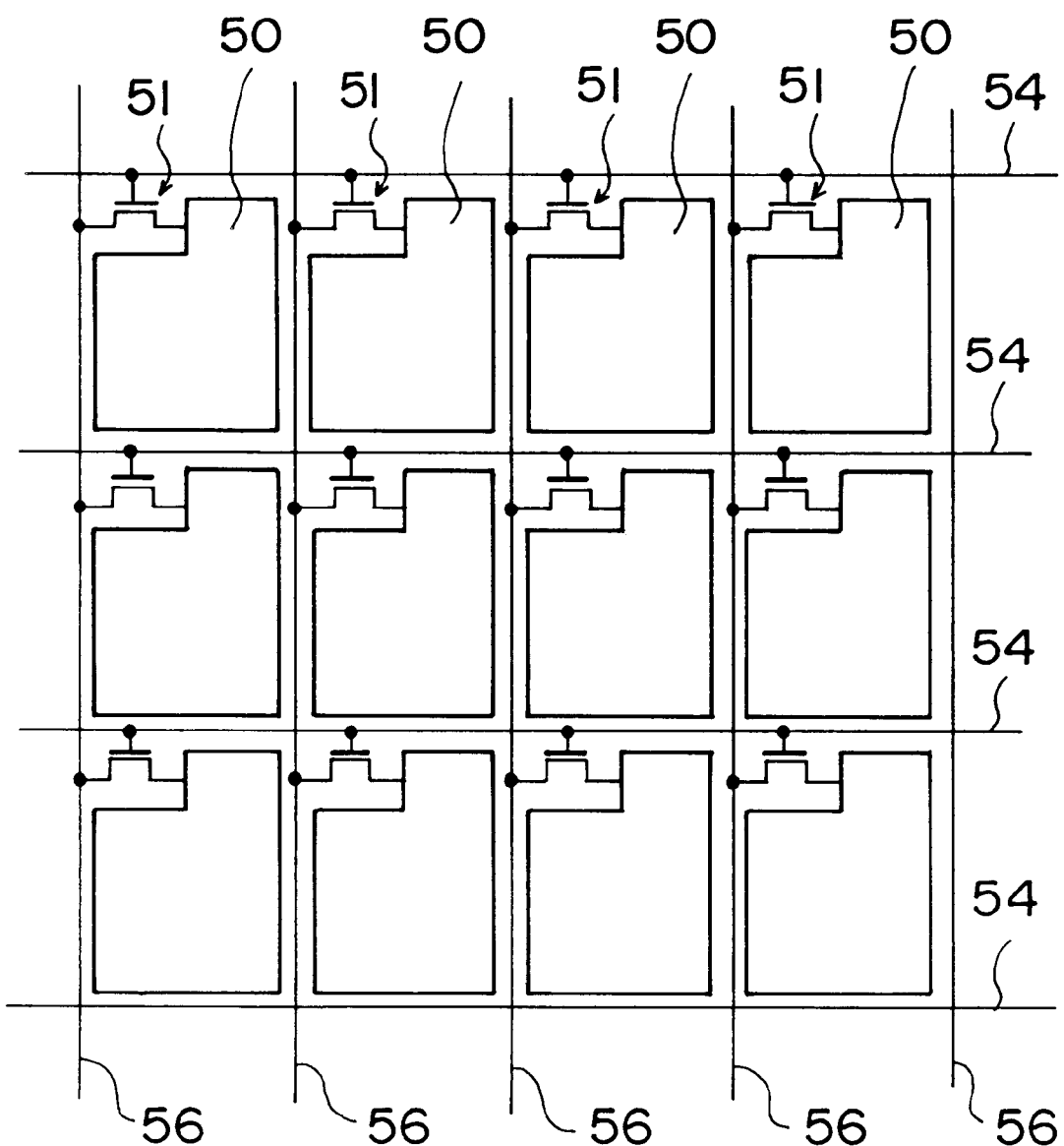
FIG. 1 is a schematic diagram illustrating one example of the conventional liquid crystal display device.
Figure 2:
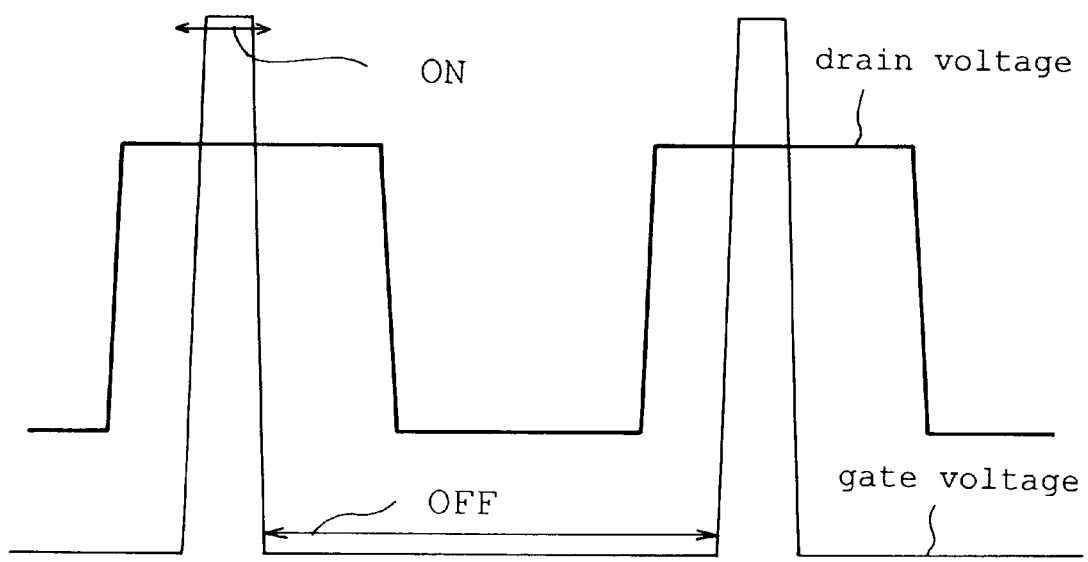
FIG 2 is a diagram illustrating the waveform of the voltage applied to gate bus lines and drain bus lines in the liquid crystal display device of FIG. 1.
Figure 3:
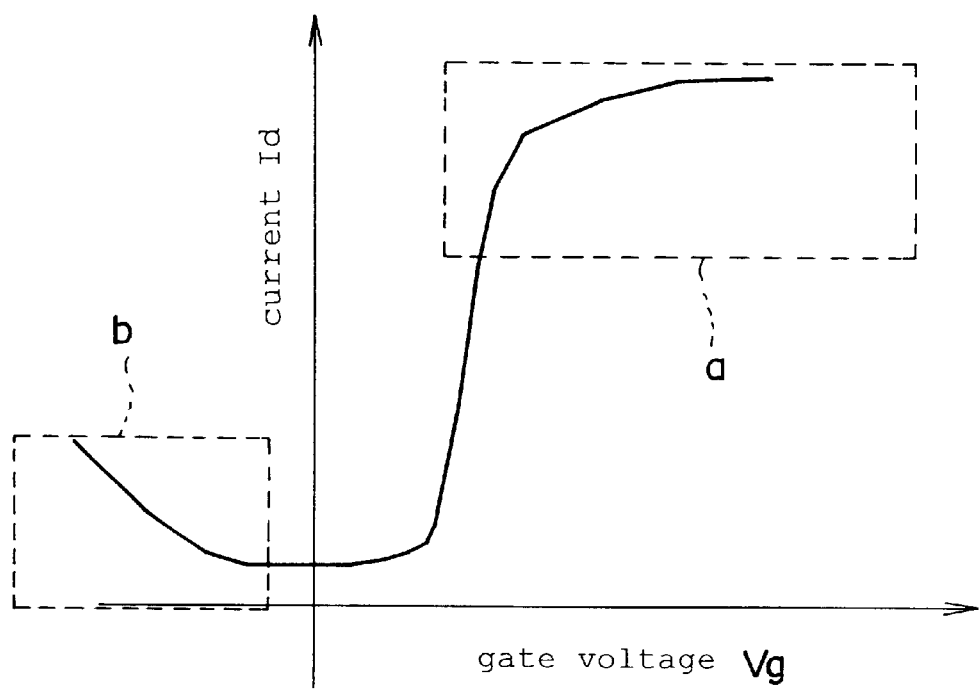
FIG. 3 is a diagram illustrating one example of the I–V characteristic of the TFT in the liquid crystal display device.
Figure 4:
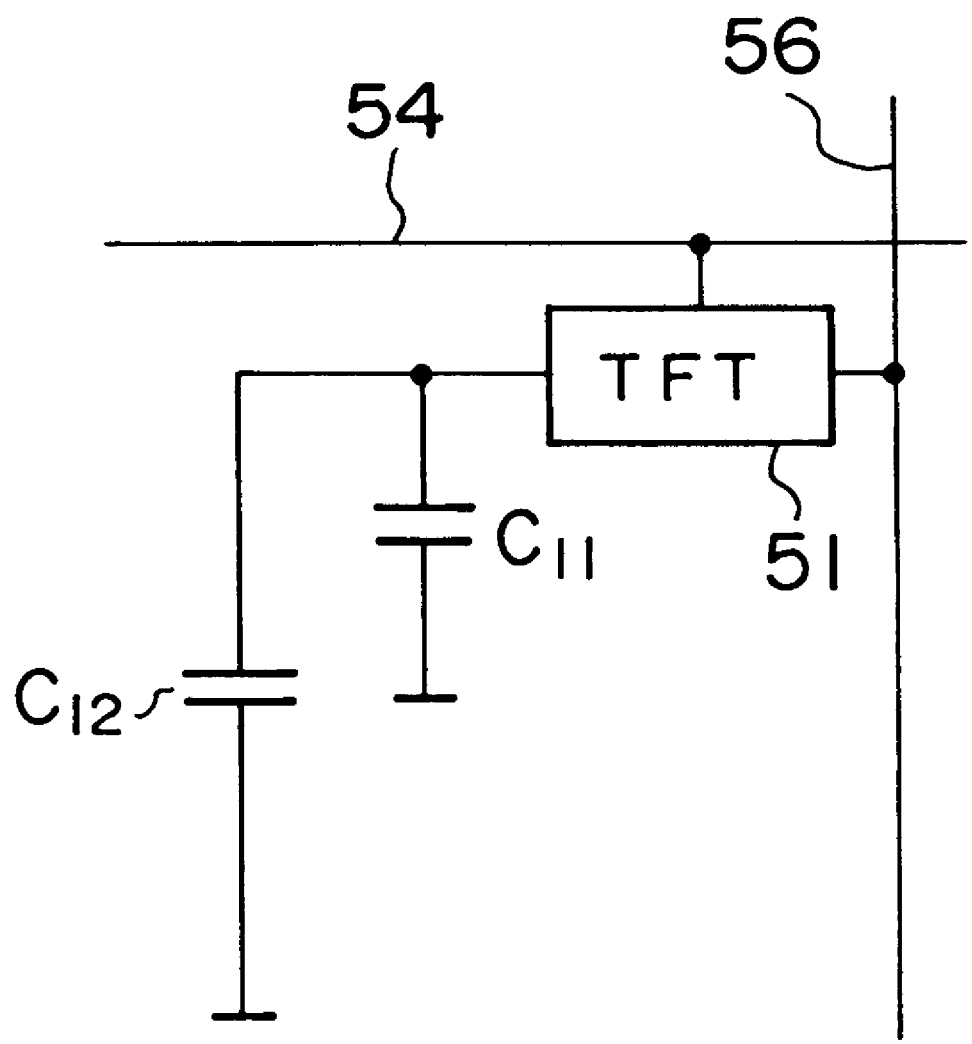
FIG. 4 is an equivalent circuit diagram of the pixel part of the liquid crystal display device of the additive capacity type.
Figure 5:
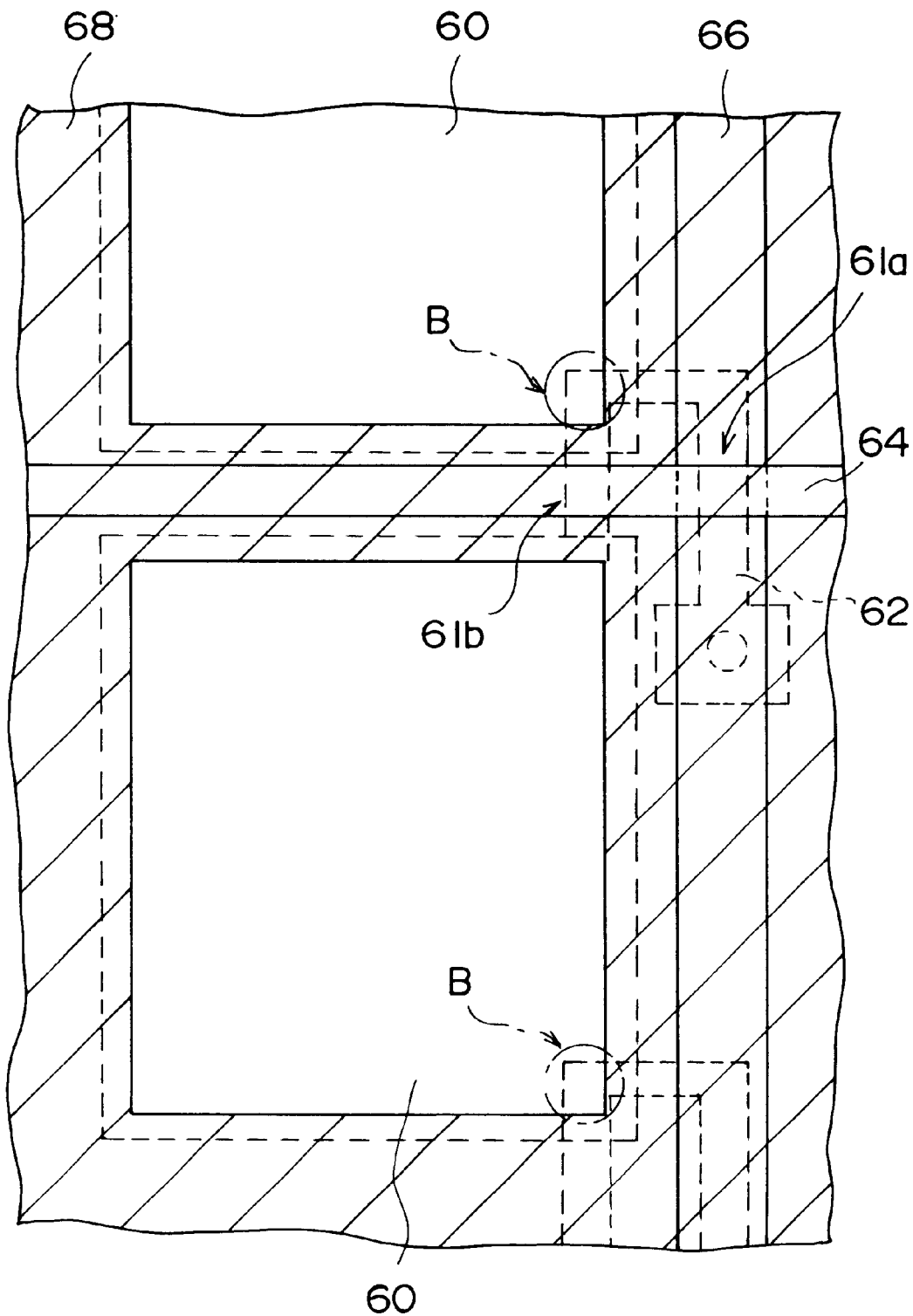
FIG. 5 is a top view illustrating the liquid crystal display device of the conventional multigate TFT structure.
Figure 6:
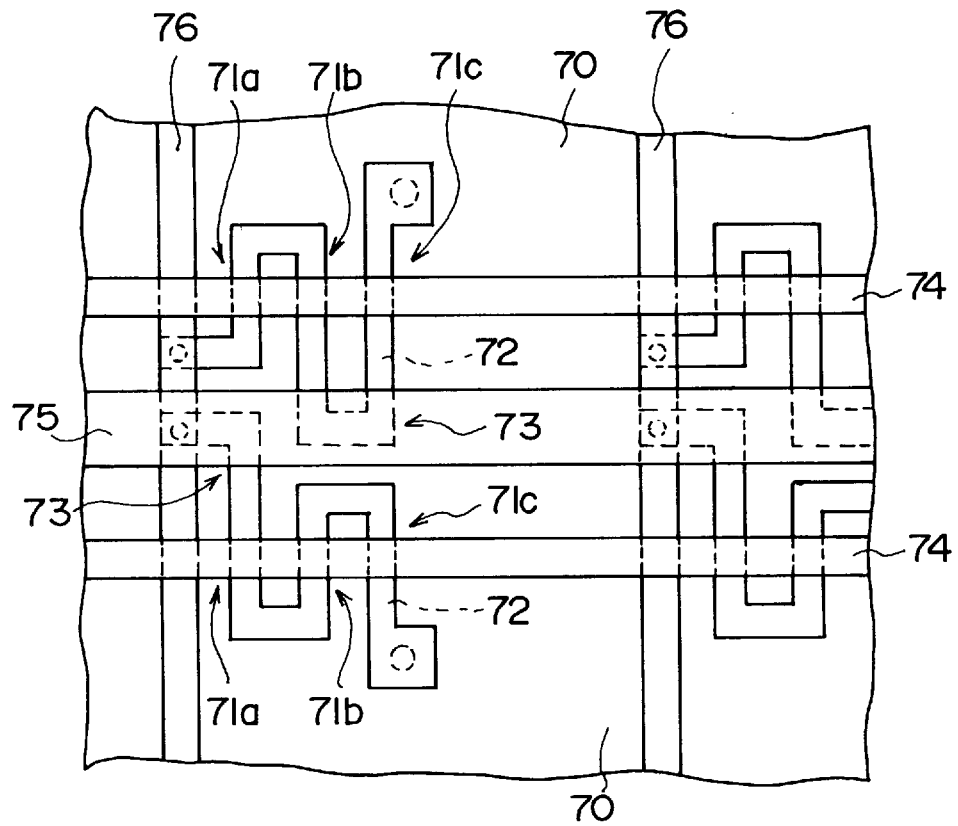
FIG. 6 is a top view illustrating another example of the liquid crystal display device of the multigate TFT structure.

The conventional liquid crystal display device illustrated in FIG. 5 shows no sufficient decrease in the OFF current as compared with the liquid crystal display device illustrated in FIG. 6. It also has the following problem when it is applied to a projection type liquid crystal display device. Specifically, the projection type liquid crystal display device projects an image by using a light source of large luminous energy (up to some millions of 1x). The TFT is so disposed as to have the current property, particularly the OFF current property, thereof degraded by light and, therefore, is required to have the channel part thereof shielded from light. In the liquid crystal display device of FIG. 5, the part denoted by the symbol B, though not a channel part but such a connecting part for the TFT as uses silicon, suffers the OFF current characteristic of the TFT to be degraded on exposure to a light with luminous energy of some millions of 1x.

In contrast, the liquid crystal display device illustrated in FIG. 6 has the following problems. Generally, the insulating films intervening between the wiring (gate, drain, black matrix, etc.) layers have such thicknesses as approximate closely to 3000 Å, whereas the gate oxide films of TFT are formed in such small thicknesses as fall on the order of 1200–1500 Å for the purpose of acquiring properties necessary for the TFT. In the liquid crystal display device illustrated in FIG. 6, since the gate insulating films are used as dielectrics between the electrodes of the capacitor, the defect of short is liable to occur between the upper and the lower electrode. This device has another disadvantage that when the glass plate has a large area, the films retain uniformity with difficulty and tend to suffer marked dispersion in the magnitude of capacitance. It also has the possibility that the gate bus lines 74 and the pour source lines 75 will be short-circuited because the power source lines 75 and the gate bus lines 74 are formed of the same material in the same layers. If the gate bus lines 74 and the power source lines 75 were short-circuited, all the pixels in the relevant lines would not be utilized for display.

The embodiments of this invention will be described below with reference to the accompanying drawings.

(First Embodiment)

Figure 8:
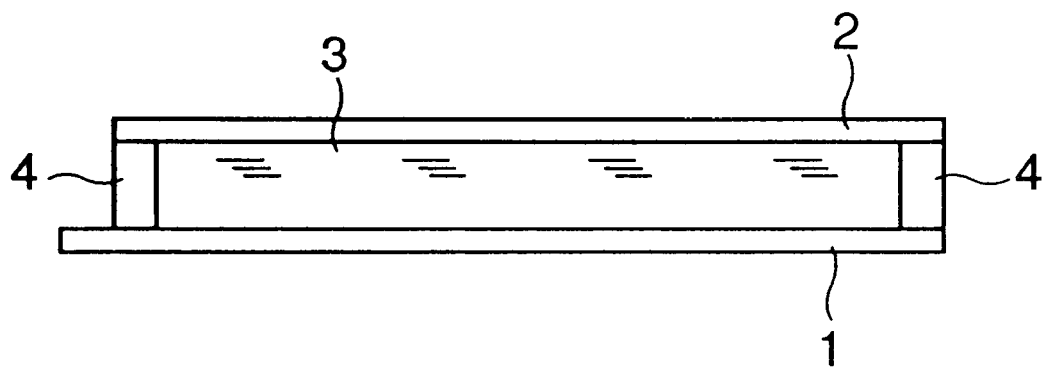
FIG. 8 is a cross section illustrating a liquid crystal display device according to the first embodiment of this invention.
Figure 9:
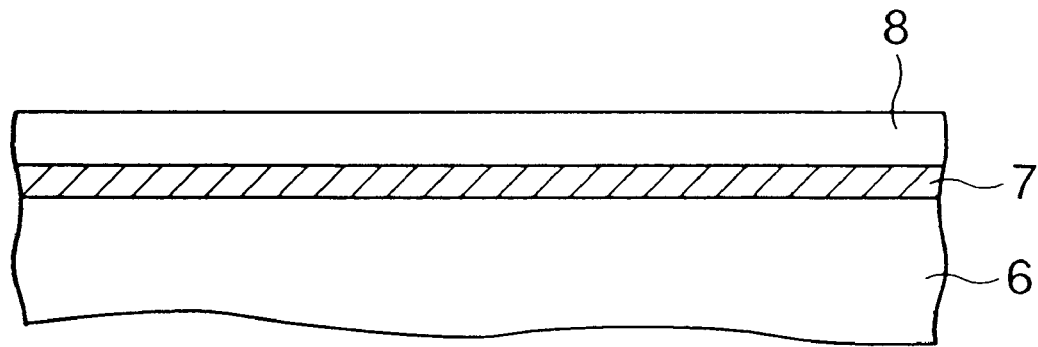
FIG. 9 is a cross section of a counter substrate in the liquid crystal display device according to the first embodiment.
Figure 10:
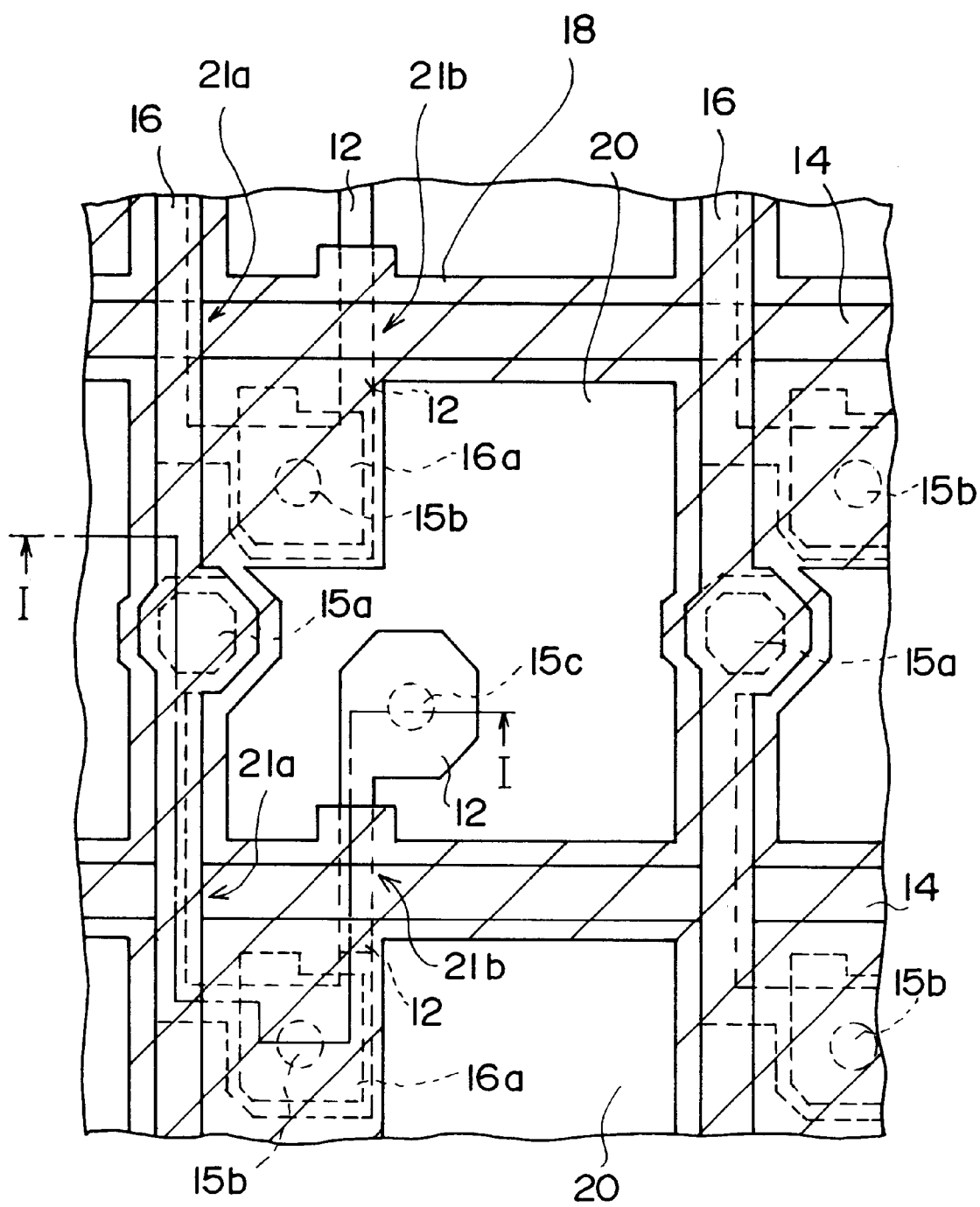
FIG. 10 is a top view of the TFT substrate in the liquid crystal display device according to the first embodiment.
Figure 11:
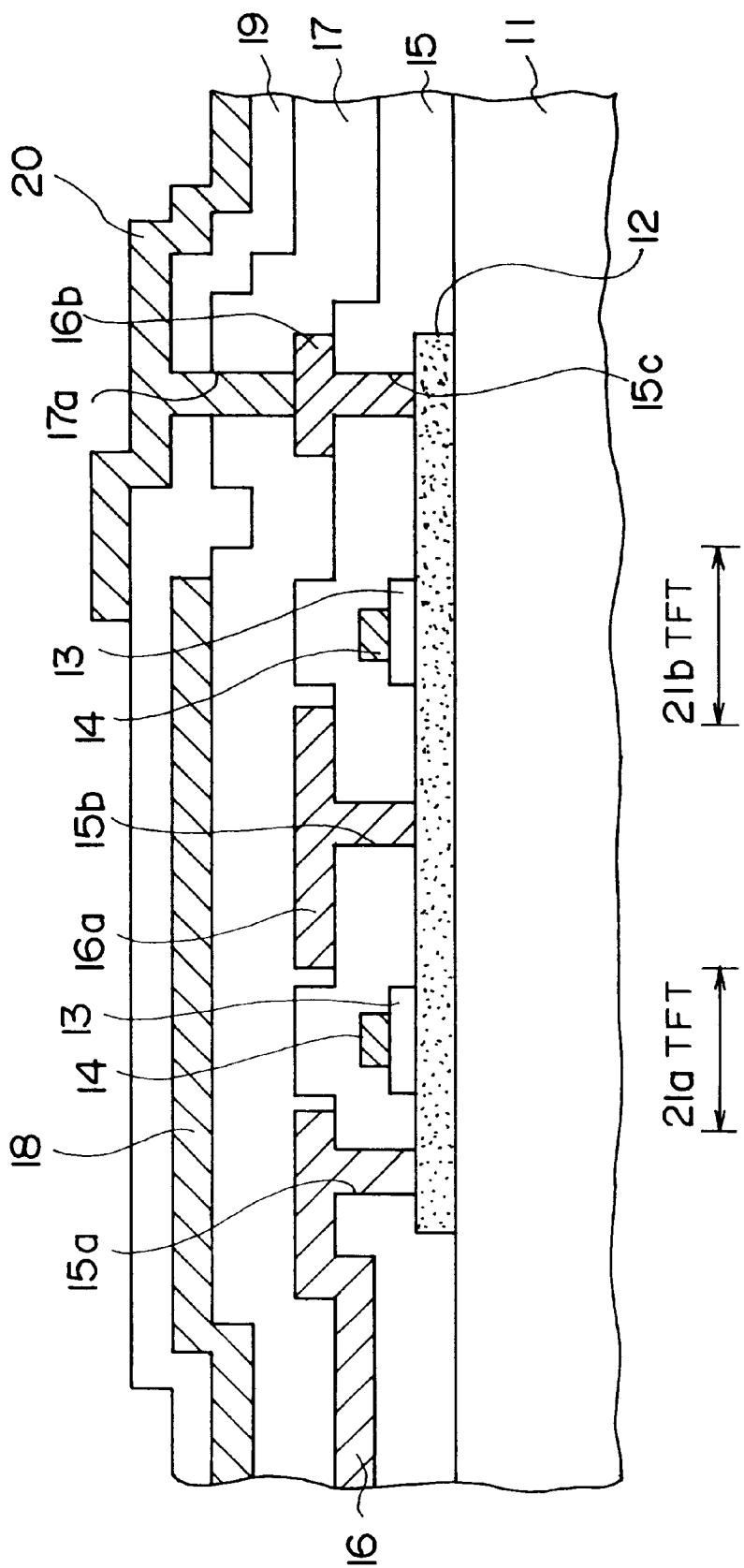
FIG. 11 is a cross section taken though FIG. 10 along the line I—I

FIG. 8 is a cross section illustrating a liquid crystal display device according to the first embodiment of this invention, FIG. 9 is a cross section of a counter substrate in the liquid crystal display device, FIG. 10 is a top view of a TFT substrate thereof, and FIG. 11 is a cross section taken through FIG. 10 along the line I—I.

The liquid crystal display device of the present embodiment is formed by opposing a TFT substrate 1 and a counter substrate 2 to each other, joining the edge parts of these substrates 1 and 2 with sealing members 4, and sealing a liquid crystal 3 between the substrates 1 and 2.

The counter substrate 2, as illustrated in FIG. 9, is composed of a glass sheet 6, a counter electrode 7 made of ITO and formed on the glass sheet 6, and an alignment layer 8 overlying the counter electrode 7. It is disposed such that the face thereof forming the alignment layer 8 confronts the TFT substrate 1.

The TFT substrate 1 is composed as illustrated in FIG. 10. A plurality of gate bus lines 14 are disposed mutually parallelly on a glass sheet 11 and a plurality of drain bus lines 16 are formed so as to intersect perpendicularly the gate bus lines 14. The rectangular areas which are defined by the gate bus lines 14 and the drain bus lines 16 severally constitute pixel areas. In each of the pixel areas, a pixel electrode 20 made of such a transparent metal film as ITO and a capacitor electrode (the first electrode) 16a. This capacitor electrode 16a forms a capacitor in conjunction with a black matrix 18 made of a light blocking metal film and formed on the capacitor electrode 16a through the medium of an interlayer insulating film. Near the portions of intersection between the gate bus lines 14 and the drain bus lines 16, two TFT's 21a and 21b are formed per pixel.

Specifically, as illustrated in the cross section of FIG. 11, a polysilicon film 12 destined to constitute sources and drains of the TFT's 21a and 21b are selectively formed on the glass sheet 11. On the polysilicon film 12, gate bus lines 14 are selectively formed through the medium of a gate insulating film 13. On the glass sheet 11, a first interlayer insulating film 15 is formed so as to overlie the polysilicon film 12 and the gate bus lines 14.

On the first interlayer insulating film 15, the drain bus lines 16, the capacitor electrodes 16a, and pads (intermediate electrodes) 16b are selectively formed. The drain bus lines 16 are electrically connected to the drains of the TFT's 21a via contact holes 15a. The capacitor electrodes 16a are electrically connected to the connecting parts of the sources of the TFT's 21a and the drains of the TFT 21b through the medium of contact holes 15b. The pads 16b are electrically connected to the sources of the TFT's 21b through the medium of contact holes 15c.

On the first interlayer insulating film 15, a second interlayer insulating film 17 is formed so as to overlie the drain bus lines 16, the capacitor electrodes 16a, and the pads 16b. On this second interlayer insulating film 17, a black matrix 18 is formed so as to overlie the gate bus lines 14, the drain bus lines 16, and the capacity electrodes 16a. The parts of the black matrix 18 that are opposed to the capacity electrodes 16a constitute a second electrode, which forms a capacitor (additive capacitor) in conjunction with the capacity electrodes 16a and the interlayer insulating film 17.

A third interlayer insulating film 19 is formed on the entire face of the second interlayer insulating film 17. A pixel electrode 20 is formed on the third interlayer insulating film 19. This pixel electrode 20 is electrically connected to the pads 16b through the medium of contact holes 17a and further to the sources of the TFT's 21 through the medium of the pads 16b.

An alignment layer (not shown) is formed on the entire face of the third ineterlayer insulating film 19. The TFT substrate 1 formed as described above is disposed such that the face thereof having the alignment layer formed therein confronts the counter substrate 2.

In the present embodiment, the black matrix 18 is connected electrically to the counter electrode outside the areas of display and retained at the same potential as the counter electrode. The black matrix 18 may be retained at a potential different from the potential of the counter electrode.

Figure 12:
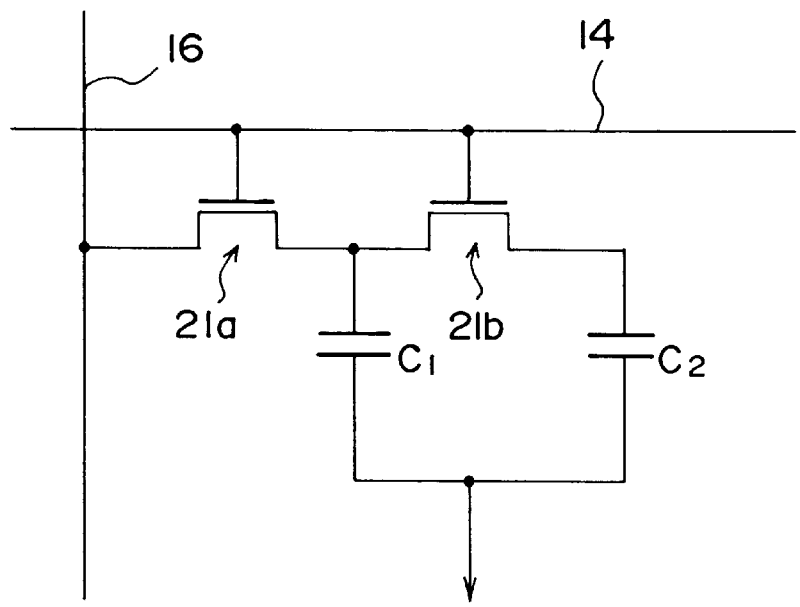
FIG. 12 is an equivalent circuit diagram of the pixel part of the liquid crystal display device according to the first embodiment.

FIG. 12 is an equivalent circuit diagram of the pixel part of the liquid crystal display device according to the present embodiment. In the diagram, C1 represents a capacitor formed of the electrode 16a and the black matrix 18 and C2 represents a capacitive component between the pixel electrode 20 and the counter electrode. In the present embodiment, since the capacitor C1 is connected between the TFT 21a and the TFT 21b, the potential is substantially equalized between the source and the drain of the TFT 21b and the OFF current of the TFT 21b is extremely small when the TFT's 21a and 21b are in the OFF state. Since the parts of the polysilicon film 12 that form the channel areas of the TFT's 21a and 21b and the connecting parts of the TFT 21a and the TFT 21b are covered by the black matrix 18, the liquid crystal display device of the present embodiment applied to a projection type liquid crystal display device precludes the otherwise inevitable growth of the OFF current in the TFT's 21a and 21b due to exposure to intense light and ensures a perfect display property.

Figure 13:
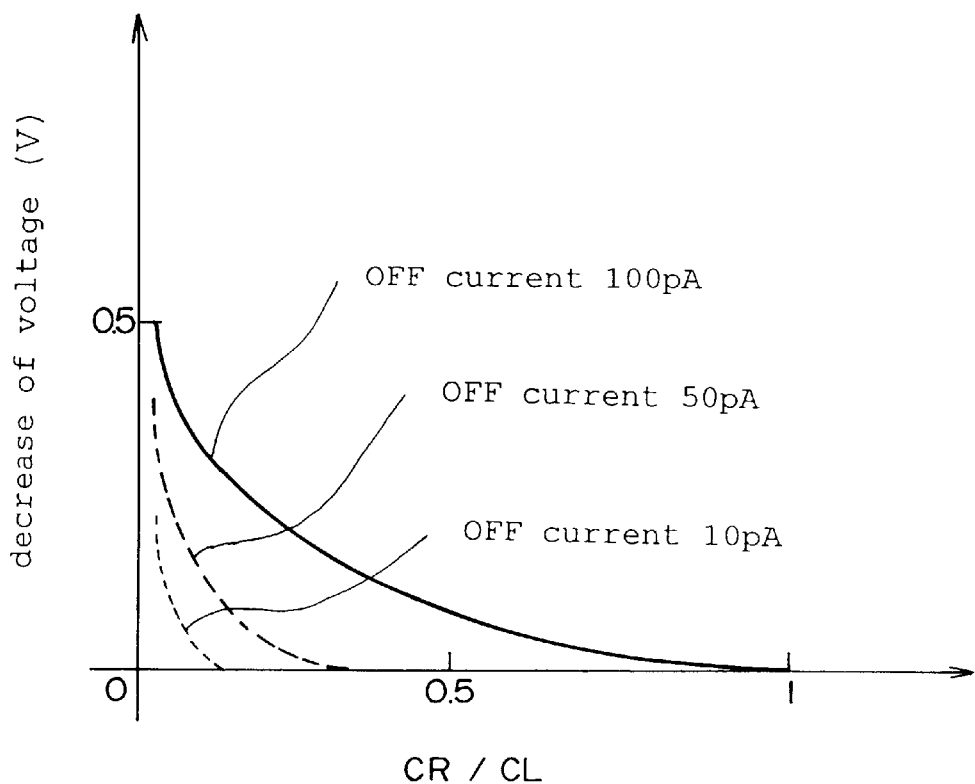
FIG. 13 is a diagram illustrating the relation between the capacity of a capacitor and the decline of voltage obtained when the OFF current of the TFT is 100 pA, 50 pA, and 10 pA in a liquid crystal display device according to the first embodiment.

FIG. 13 is a diagram showing the relation between the capacity of the capacitor and the decrease of the voltage obtained when the OFF current of the TFT is 100 pA, 50 pA, and 10 pA. In the diagram, the horizontal axis is the scale of the ratio of the magnitude of capacitance CR of the capacitor C1 and the magnitude of capacitance CL of the capacitive component $C_2$ between the pixel electrode 20 and the counter electrode and the horizontal axis is the scale of the amount of the decrease of the voltage. When the OFF current of the TFT is on the order of some tens of pA, it suffices to resort to the formula, CR=m×CL (wherein m satisfies the expression, 0<m<1). If m exceeds 1, the open area ratio will markedly decline. This diagram tells how to compute the magnitude of capacitance of the capacitor C1 for the purpose of lowering the voltage to below a given level.

Figure 14A:
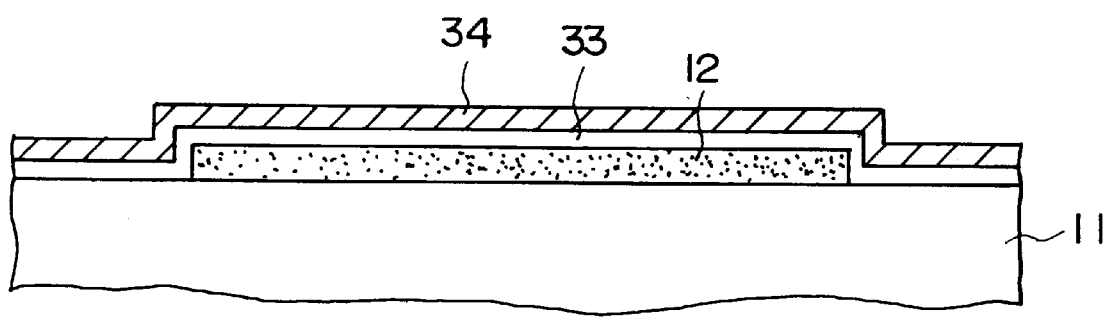
FIGS. 14A–14D are cross sections schematically illustrating a process for the production of the liquid crystal display device according to the first embodiment.

FIG. 14A–FIG. 14D are schematic cross sections illustrating sequentially the steps of the process for the production of the liquid crystal display device mentioned above. First, an amorphous silicon film is formed in a thickness of 500 Å on the glass sheet 11 by the use of the plasma CVD technique as illustrated in FIG. 14A. Then, this amorphous silicon film is exposed to a laser beam to be transformed into the polysilicon film 12. Thereafter, the polysilicon film 12 is selectively etched by the dry etching technique and allowed to survive in a zigzag shape only in a prescribed area.

Next, a $SiO_2$ film 33 is formed in a thickness of 1200 Å on the entire face of the glass sheet 11 by the use of the plasma CVD technique. Thereafter, a metal film 34 such as of aluminum is formed in a thickness of 3000 Å on the $SiO_2$ film 33 by the use of the sputtering technique.

Figure 14B:
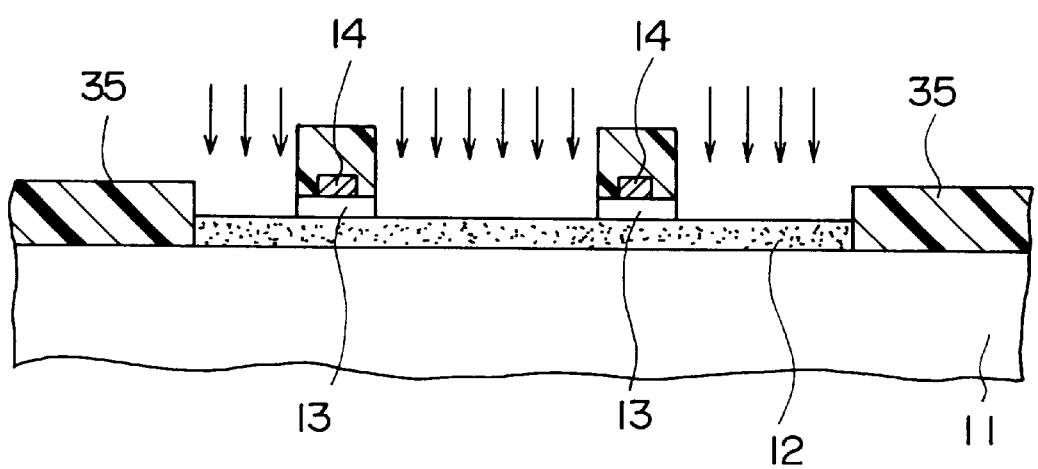

Next, the metal film 34 is patterned in a prescribed shape to form gate bus lines 14 by the use of the photolithographic technique as illustrated in FIG. 14B. Thereafter, the SiO₂ film is patterned by the use of the photolithographic technique to allow the SiO₂ film 33 to survive exclusively in the proximity of the gate bus lines 14 and remove the SiO₂ film 33 in the other areas. As a result, the parts of the SiO₂ film 33 which survive beneath the gate bus lines 14 constitute the gate insulating films 13. Thereafter, a mask 35 provided with an opening part for exposing the polysilicon film 12 is formed and an impurity diffusing area destined to form sources and drains of the TFT's 21a and 21b are formed by ion injecting an n type impurity into the polysilicon film 12 and activating the polysilicon film 12 by exposure to a laser. Subsequently, the mask 35 is removed.

Figure 14C:
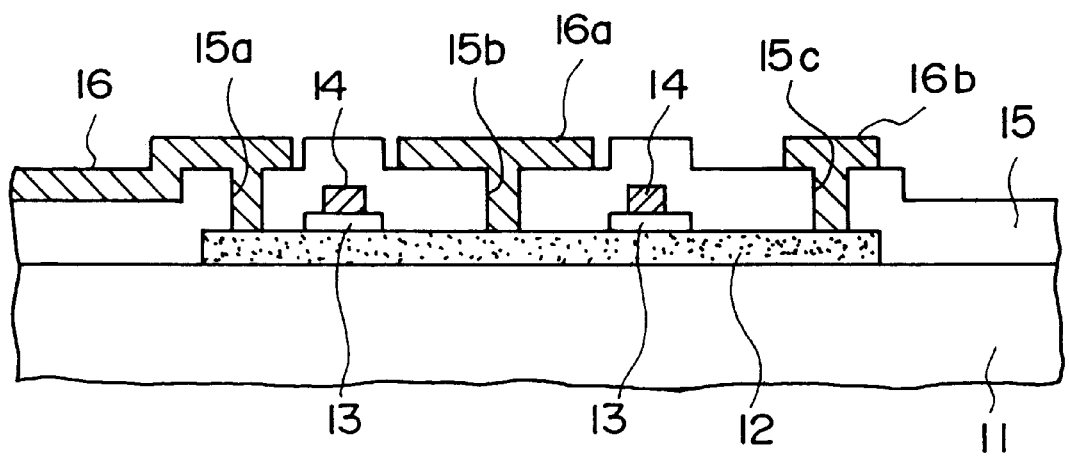

Next, a first interlayer insulating film 15 is formed in a thickness of 4000 Å on the entire face as illustrated in FIG. 14C. This first interlayer insulating film 15 is formed, for example, in a two-layer structure consisting of a SiO₂ film and a SiN film. Thereafter, contact holes 15a, 15b, and 15c are selectively formed in the first interlayer insulating film 15.

Next, a conducting film of a three-layer structure of Ti (titanium) film/Al (aluminum) film/Ti film is formed in a thickness in the range of 4000–5000 Å on the first interlayer insulating film 15 in such a manner as to fill up the contact holes 15a, 15b, and 15c. Then, by patterning this conducting film in a prescribed shape, the drain bus lines 16, capacity electrodes 16a, and pads 16b are formed.

Figure 14D:
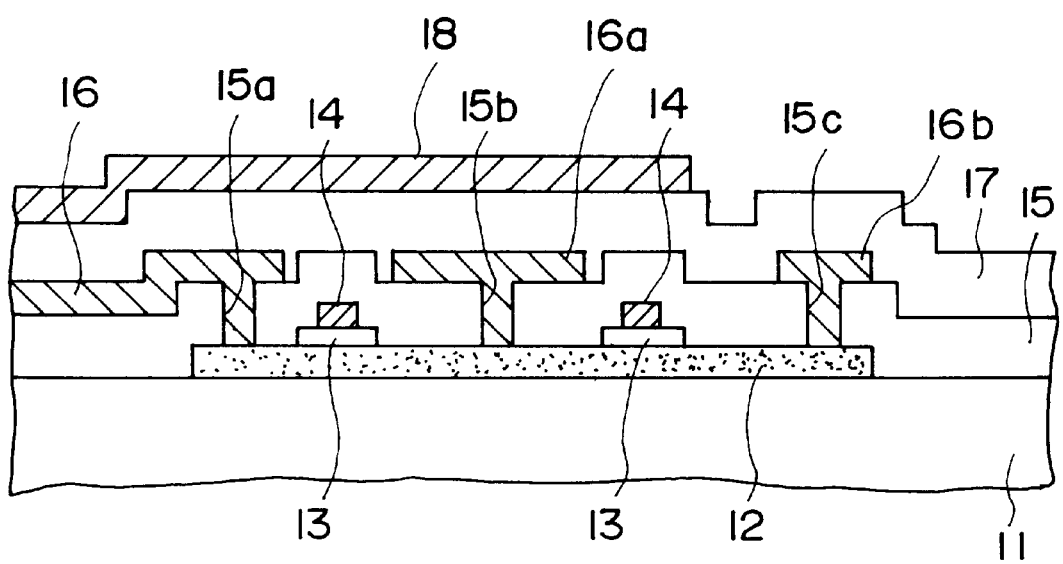

Next, the second interlayer insulating film 17 of SiN is formed in a thickness of 4000 Å as illustrated in FIG. 14D on the first interlayer insulating film 15 in such a manner as to cover the drain bus lines 16, capacity electrodes 16a, and pads 16b. Thereafter, a Ti film is formed in a thickness of 2000 Å on the second interlayer insulating film 17 and the black matrix 18 is formed by etching the Ti film in a prescribed pattern. As the material for this black matrix 18, chromium (Cr) or the like may be used in the place of Ti mentioned above.

Next, a SiN film is formed in a thickness of 3000 Åas the third interlayer insulating film 19 on the entire face as illustrated in FIG. 11. Then, the contact holes 17a extending from the surface of the third interlayer insulating film 19 through the pads 16b are formed by the photolithographic technique. Thereafter, the pixel electrode 20 is obtained in a prescribed shape by forming an ITO film in a thickness of 1000 Å on the entire face of the third interlayer insulating film 19 in such a manner as to fill the contact holes 17a.

Then, an alignment layer (not shown) is formed on the entire face. As a result, the TFT substrate 1 is completed. The counter substrate 2 having the counter electrode 7 and the alignment layer 8 formed therein is opposed to the TFT substrate 1, the TFT substrate 1 and the counter substrate 2 are joined with the sealing member 4, and the liquid crystal 3 is sealed between the two substrates 1 and 2. Thus, the liquid crystal display device of the present embodiment is completed.

The process of production described above enables the liquid crystal display device provided with the TFT substrate 1 of the structure illustrated in FIG. 10 and FIG. 11 to be manufactured easily without entailing any addition to the number of steps of the process because it forms the capacitor electrode 16a simultaneously with the drain bus lines 16 and completes the capacitor with the capacity electrode 16a, the interlayer insulating film 17, and the black matrix 18.

Figure 7:
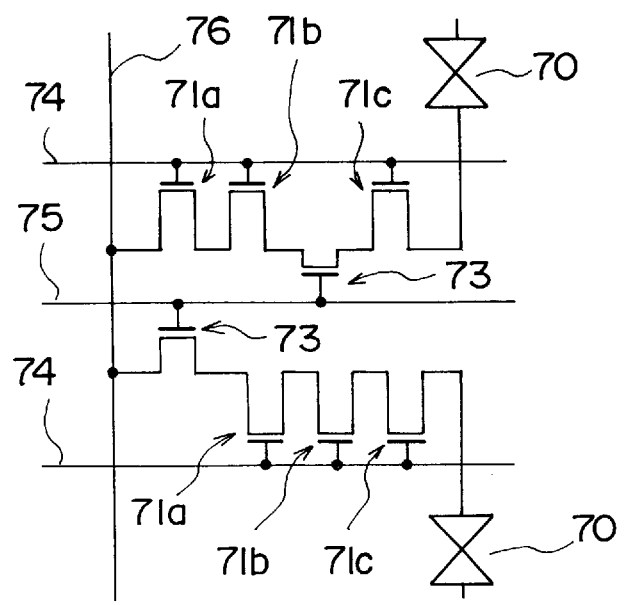
FIG. 7 is an equivalent circuit diagram of the pixel part thereof.

In the liquid crystal display device formed by the process described above, even when the capacitor electrode 16a and the drain bus line 16 are short-circuited, all the pixels in the relevant line do not incur defective display, while the pixels directly involved in the short circuit suffer defective display. Further, since the process of production described above utilizes the second interlayer insulating film 17 as a dielectric between the electrodes of the capacitor, it can preclude infallibly the occurrence of the defect of short as compared with the conventional liquid crystal display device illustrated in FIG. 6 and FIG. 7 which utilizes the gate insulating film of the TFT as a dielectric for the capacitor.

Though the process of production, as depicted above, forms simultaneously the drain bus line 16 and the capacity electrode 16a, these parts may be separately formed. Though the process of production has been depicted as utilizing part of the black matrix as an electrode of the capacitor, the electrode of the capacitor and the black matrix may be separately formed. Though the embodiment has been described with respect to the case of forming the semiconductor layer destined to function as a source and a drain of the TFT with polysilicon, this semiconductor layer may be formed of amorphous silicon instead.

(Second Embodiment)

Figure 15:
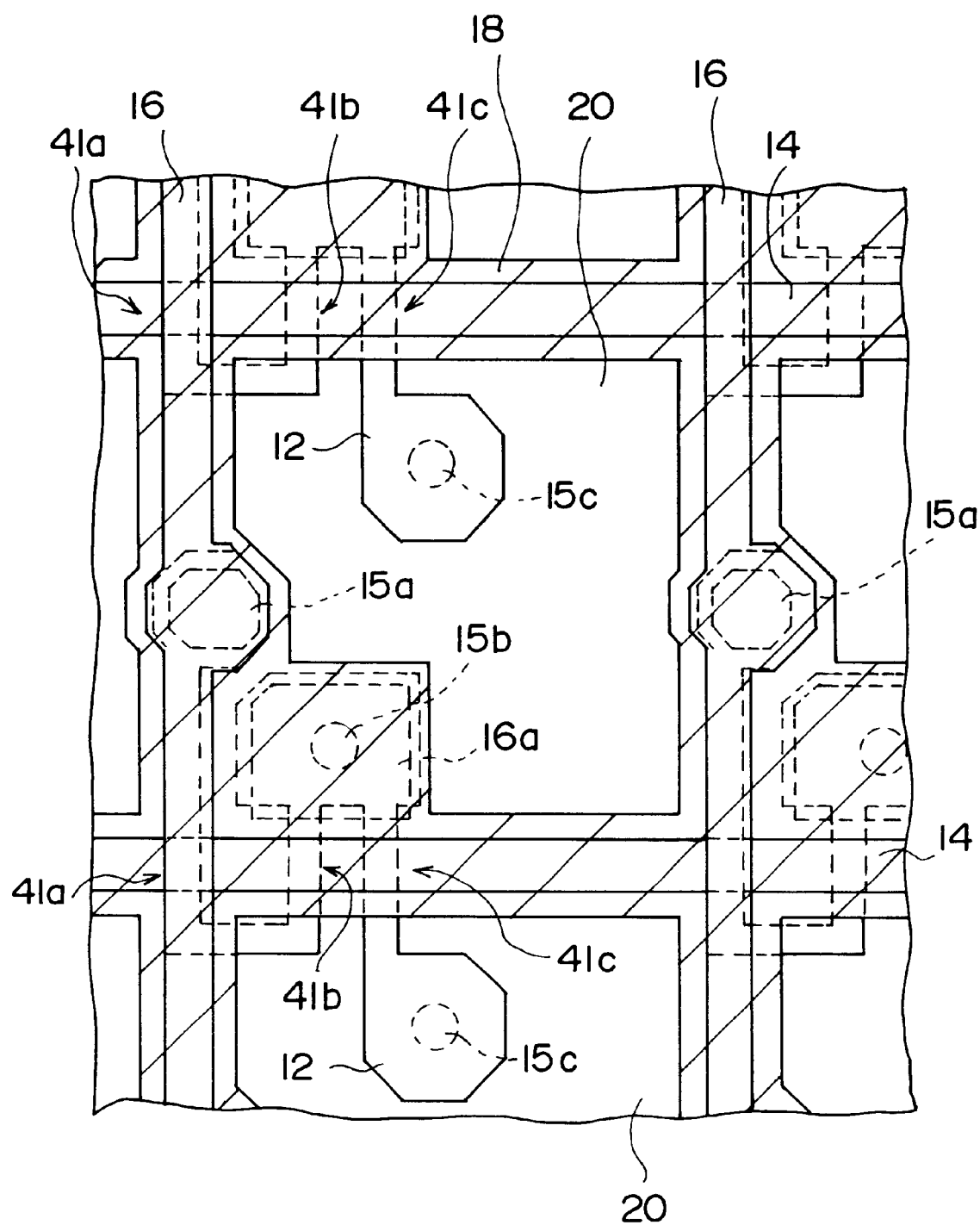
FIG. 15 is a top view illustrating the TFT substrate in a liquid crystal display device according to the second embodiment of this invention.

FIG. 15 is a top view illustrating the TFT substrate of a liquid crystal display device according to the second embodiment of this invention. In this embodiment, since the structure of the counter substrate is identical with that of the first embodiment, the illustration thereof is omitted. In FIG. 15, like parts found in FIG. 10 are denoted by like reference numerals and are omitted from the detail description herein.

In the present embodiment, three TFT's 41a, 41b, and 41c are provided per pixel. These TFT's 41a, 41b, and 41c are connected in series between the drain bus line 16 and the pixel electrode 20. Similarly in the first embodiment, the capacitor electrode 16a and the black matrix 18 jointly form a capacitor and this capacitor is connected to the connecting part of the TFT 41b and the TFT 41c.

The present embodiment attains an effect of further allaying the OFF current because it has three TFT's connected in series between the drain bus line 16 and the pixel electrode 20.

Optionally, four or more TFT's may be connected between the drain bus line and the pixel electrode. The capacitor may be connected to the connecting part of the TFT 41a and the TFT 41b. It may be otherwise connected both to the connecting part of the TFT 41a and the TFT 41b and to the connecting part of the TFT 41b and the TFT 41c.

(Third Embodiment)

Figure 16:
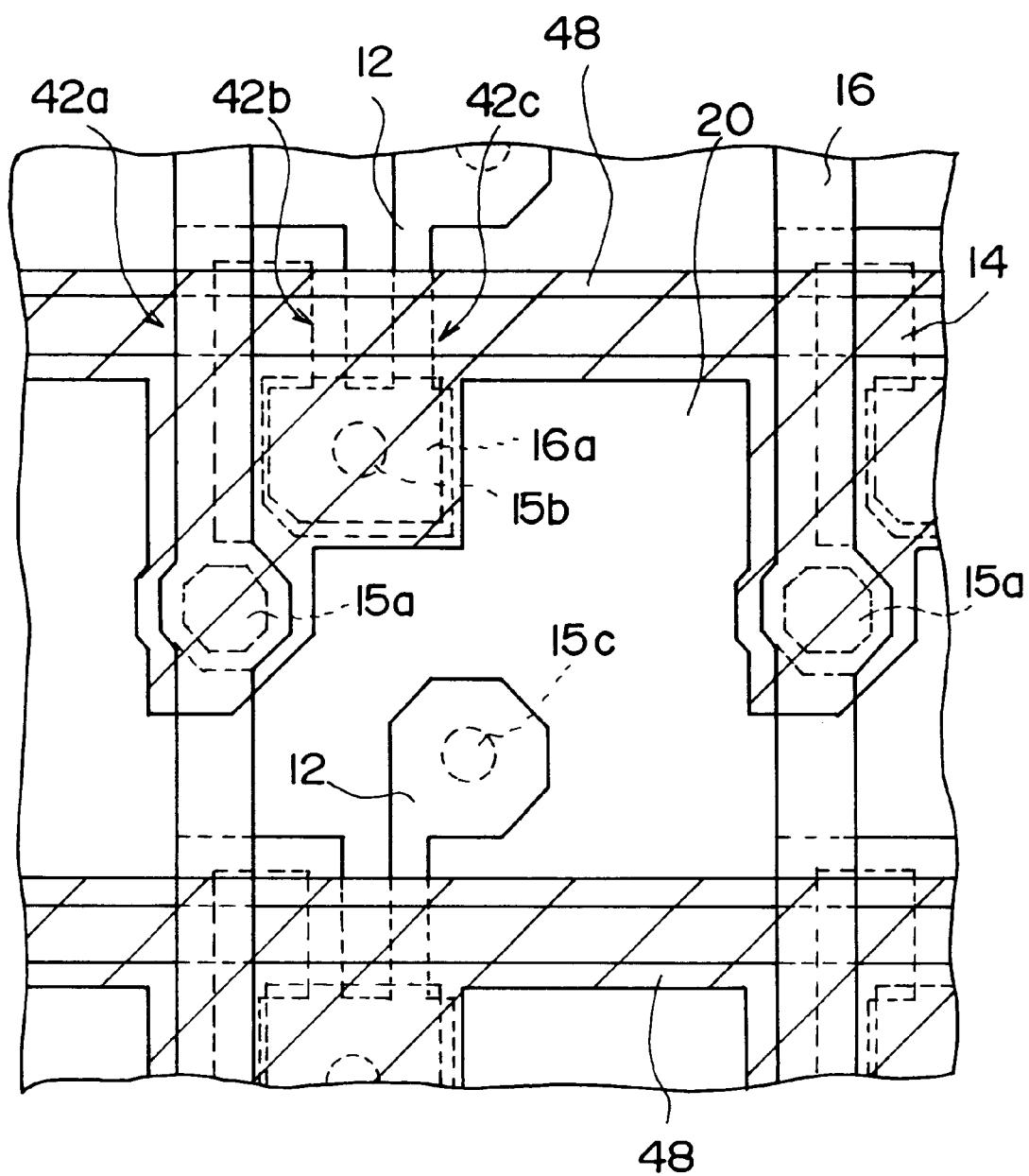
FIG. 16 is a top view illustrating a liquid crystal display device according to the third embodiment of this invention.

FIG. 16 is a top view illustrating the TFT substrate of a liquid crystal display device according to the third embodiment of this invention. Again in the present embodiment, since the structure of the counter substrate is identical with that of the first embodiment, the illustration thereof is omitted. In FIG. 16, like parts found in FIG. 10 are denoted by like reference numerals and are omitted from the detail description herein.

In the present embodiment, three TFT's 42a, 42b, and 42c are provided per pixel. These TFT's 42a, 42b, and 42c are connected in series between the drain bus line 16 and the pixel electrode 20. Similarly in the first embodiment, the capacity electrode 16a and the black matrix 18 jointly forms a capacitor. This capacitor is connected to the connecting part of the TFT 41b and the TFT 41c. In the present embodiment, the black matrixes 48 are separated one for each of the component rows.

In this embodiment, similarly in the second embodiment, the OFF current is allayed to a greater extent than in the first embodiment because the three TFT's are connected in series between the drain bus line 16 and the pixel electrode 20.

(Fourth Embodiment)

Figure 17:
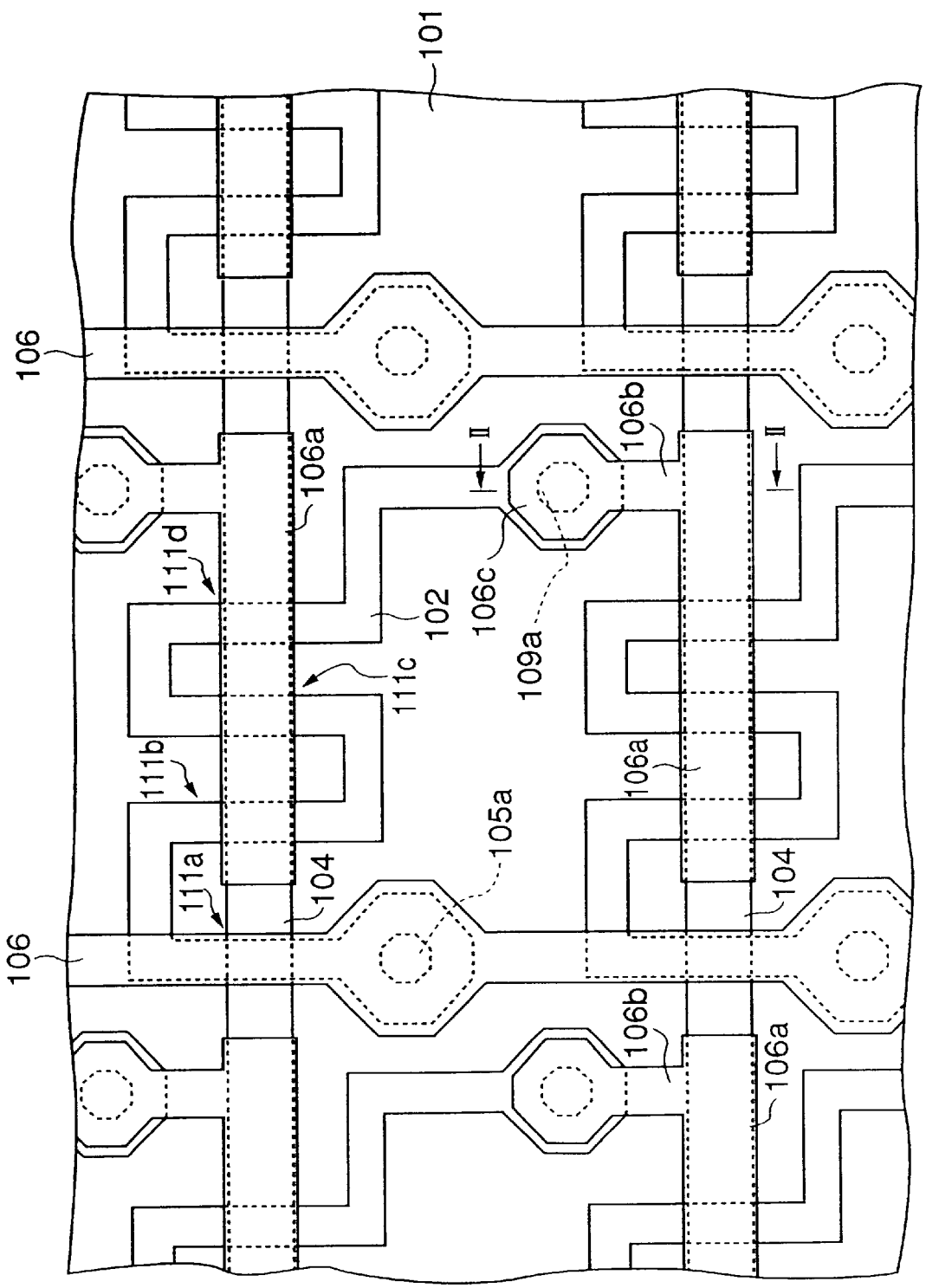
FIG. 17 is a top view illustrating the TFT substrate in a liquid crystal display device according to the fourth embodiment of this invention.
Figure 18:
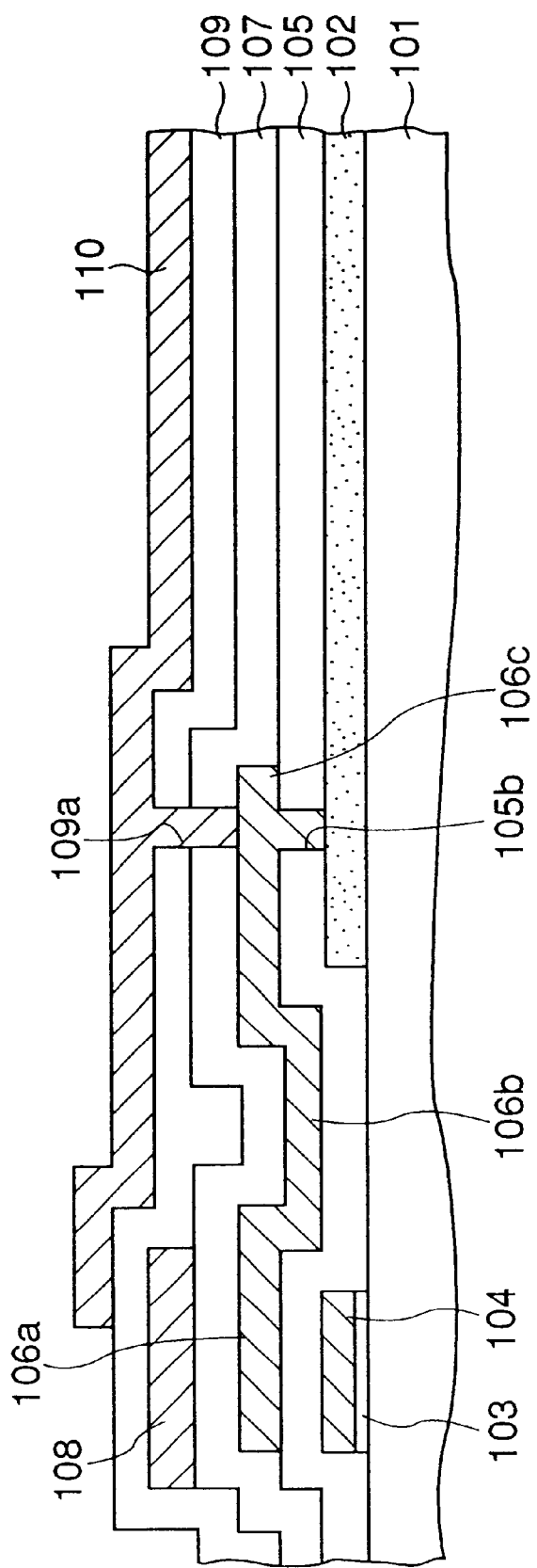
FIG. 18 is a schematic cross section taken through FIG. 17 across the line II—II.

FIG. 17 is a top view illustrating the TFT substrate of a liquid crystal display device according to the fourth embodiment of this invention and FIG. 18 is a schematic cross section taken through FIG. 17 along the line II—II. Again in the present embodiment, since the structure of the counter substrate is identical with that of the first embodiment, the illustration thereof is omitted.

On a glass sheet 101, a silicon film 102 is formed in a zigzag shape. On the glass sheet 101, a plurality of gate bus lines 104 are formed. These gate bus lines 104 are disposed parallelly to each other. A gate insulating film 103 is formed between the gate bus lines 104 on the one part and the silicon film 102 as the other part. In the present embodiment, the polysilicon film 102 and the gate bus lines 104 jointly form four TFT's 111a–111d. These TFT's 111a–111d are connected in series.

On the glass sheet 101, an interlayer insulating film 105 for covering the polysilicon film 102 and the gate bus line 104 is formed. On this insulating film 105, a plurality of drain bus lines 106, a capacitor electrode 106a, a wiring 106b, and a pad 106c are formed. The drain bus lines 106 are so disposed as to intersect perpendicularly the gate bus lines 104. The rectangular areas defined by the drain bus lines 106 and the gate bus lines 104 severally constitute pixel areas. The drain bus lines 106 are connected to the terminal part of the polysilicon film 102 through the medium of a contact hole 105a. The capacitor electrode 106a is disposed above the adjacent gate bus line 104. The capacitor electrode 106a and the gate bus line 104 underlying it jointly form a capacitor. The pad 106c is connected electrically to the terminal part of the silicon film 102 through the medium of a contact hole 105b. The wiring 106b electrically connects the pad 106c and the capacitor electrode 106a.

Incidentally, the wiring 106b is preferred to be as short as possible. This is because the silicon film 102 is pervious to light and the wiring 106b is impervious to light and, as a consequence, the open area ratio decreases in accordance as the length of the wiring 106b increases.

An interlayer insulating film 107 is formed on the insulating film 105 and this insulating film 107 covers the drain bus line 106, the capacitor electrode 106a, the wiring 106b, and the pad 106c. A black matrix 108 (omitted from illustration in FIG. 17) made of Ti or Cr is formed on this insulating film 107. The black matrix 108 overlies the gate bus line 104 and the drain bus line 106.

On the insulating film 107, an interlayer insulating film 109 which covers the black matrix 108 is formed. A pixel electrode 110 (omitted from illustration in FIG. 17) made of ITO is formed on the insulating film 109. The pixel electrode 110 is connected to the wiring 106a through a the medium of a contact hole 109a bored through the insulating films 107 and 109.

An alignment layer (not shown) made of polyimide is formed on the insulating film 107 and the pixel electrode 110 is covered with this alignment layer.

The TFT substrate which is constructed as described above is opposed to the counter substrate as illustrated in FIG. 8 and the liquid crystal display device is completed by sealing a liquid crystal (not shown) in the gap between these opposed substrates.

Figure 19:
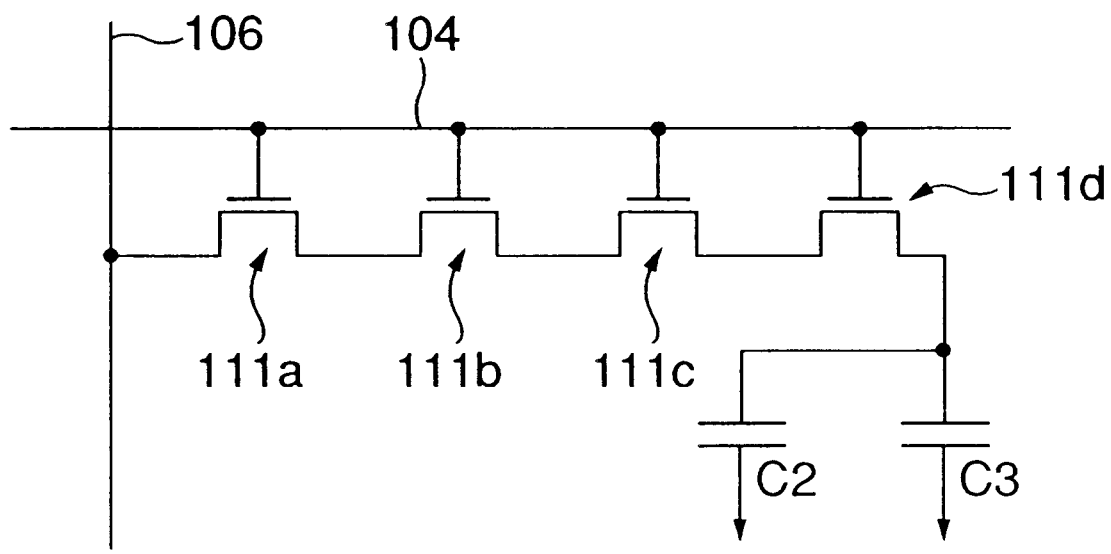
FIG. 19 is an equivalent circuit diagram of the pixel part of the liquid crystal display device according to the fourth embodiment.

FIG. 19 is an equivalent circuit diagram of the pixel part of the liquid crystal display device according to the present embodiment. In the diagram, C3 denotes a capacitor formed jointly by the capacitor electrode 106a and the gate bus line 104 and C2 a capacitive component intervening between the pixel electrode 110 and the counter electrode. The liquid crystal display device of the present embodiment enjoys an improved display quality because it has the capacitor C3 added to the capacitive component C2 of the pixel electrode 110 and the counter electrode. Further, the pixel area is not covered with the capacitor electrode 106a and the open area ratio is allowed to be large because the capacitor is formed with the capacitor electrode 106a which is disposed above the gate bus line 104. Consequently, the liquid crystal display device produces a bright image.

Now, the process for producing the liquid crystal display device according to the present embodiment will be described below.

First, an amorphous silicon film is formed in a thickness of 500 Å on the glass sheet 101 by the use of the plasma CVD technique. Then, this amorphous silicon film is exposed to a laser beam to be transformed into the polysilicon film 102. Thereafter, the polysilicon film 102 is selectively etched by the dry etching technique and allowed to survive only in a prescribed area.

Next, a SiO$_2$ film destined to serve as the gate insulating film 103 is deposited in a thickness of 1200 Å on the entire face of the substrate 101 by the use of the plasma CVD technique. Thereafter, an aluminum (Al) is formed on the entire face of the glass sheet 101 by the use of the sputtering technique. This aluminum film is patterned in a prescribed shape to form the gate bus line 104. Thereafter, the SiO$_2$ film is patterned by the use of the photolithographic technique to allow the SiO$_2$ film to survive exclusively in the proximity of the gate bus lines 104 and remove the SiO$_2$ film in the other areas. As a result, the part of the SiO$_2$ film which survives beneath the gate bus line 104 constitute the gate insulating film 103.

Thereafter, impurity ions are injected into the polysilicon film 102 lying on the opposite sides of the gate bus line 104 to form an impurity diffusing area destined to form sources and drains of the TFT's 111a–111d.

Next, the insulating film 105 is formed in a thickness of 4000 Å on the glass sheet 101. The insulating film 105 is formed of SiO$_2$ or SiN. Subsequently, the contact holes 105a and 105b are bored in the insulating film 105. These contact holes 105a and 105b are opened on the opposed terminal parts of the silicon film 102.

Next, a metal film is formed in a thickness in the range of 4000–5000 Å on the entire face of the insulating film 105. This metal film is produced in a three-layer structure of Ti (titanium)/Al (aluminum)/Ti (titanium), for example. Then, the drain bus line 106, the capacitor electrode 106a, the wiring 106b, and the pad 106c are formed by patterning the metal film in a prescribed shape. The drain bus line 106 is electrically connected to one terminal side of the silicon film 102 through the medium of the contact hole 105a and the pad 106c is electrically connected to the other terminal side of the silicon film 102 through the medium of the contact hole 105b.

Then, the insulating film 107 made of SiN, for example, is formed in a thickness of 4000 Å on the insulating film 105. The drain bus line 106, the capacitor electrode 106a, the wiring 106b, and the pad 106c are covered with the insulating film 107. Thereafter, the black matrix 108 is formed by depositing a Ti film on the insulating film 107 and then patterning this Ti film. The black matrix 108 is so formed as to overlie the gate bus line 104 and the drain bus line 106.

Next, the insulating film 109 made of SiN, for example, is formed in a thickness of 3000 Å on the insulating film 107 so as to cover the black matrix 108. Thereafter, the contact hole 109a is bored by selectively etching the insulating films 107 and 109. Then, an ITO film is formed on the entire face in a thickness of 1000 Å and this ITO film is etched to obtain the pixel electrode 110 in a prescribed shape. This pixel electrode 110 is connected electrically to the pad 106*c* through the medium of the contact hole 109*a*.

An alignment layer is subsequently formed on the insulating film 109 so as to cover the pixel electrode 110. Thereafter, the counter substrate having a counter electrode and an alignment layer formed therein is opposed to the substrate 101 and a liquid crystal is sealed in the gap between the substrate 101 and the counter substrate. Thus, the liquid crystal display device of the present embodiment is completed.

The process of production described above precludes the otherwise possible addition to the number of steps thereof because the capacitor electrode 106*a*, the wiring 106*b*, and the pad 106*c* are formed simultaneously with the drain bus line 106. The liquid crystal display device of the structure illustrated in FIG. 17 and FIG. 18, therefore, can be manufactured by this process at a low cost.

Figure 20:
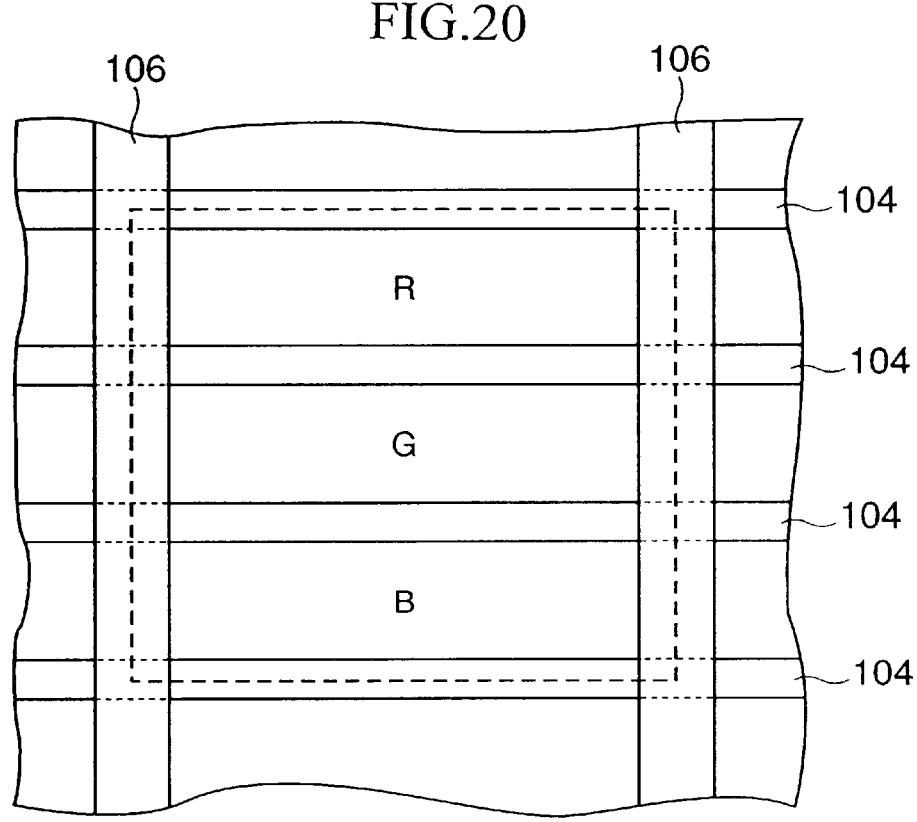
FIG. 20 is a plan view illustrating an example of the application of the liquid crystal display device according to the fourth embodiment to a color liquid crystal display device.

FIG. 20 is a plan view illustrating one example of the application of the liquid crystal display device of the present embodiment to a color liquid crystal display device. In the liquid crystal display device of the structure illustrated in FIG. 17 and FIG. 18, part of the pixel area is covered with the wiring 106*b* made of a metal. For the purpose of exalting the open area ratio, therefore, the shape of each pixel is preferred to be given a larger size in the direction of length (the horizontal direction) of the gate bus line 104 and a smaller size in the direction of length (the vertical direction) of the drain bus line 106. When the pixels each assume the rectangular shape long in the horizontal direction and short in the vertical direction, the three vertically adjacent pixel areas form one dot during color display as illustrated in FIG. 20. An R (red) color filter is allocated to one of these three pixel areas, a G (green) color filter to one of the other two pixel areas, and a B (blue) color filter to the remaining one pixel area. As a result, one dot acquires a substantially square shape.

Figure 21:
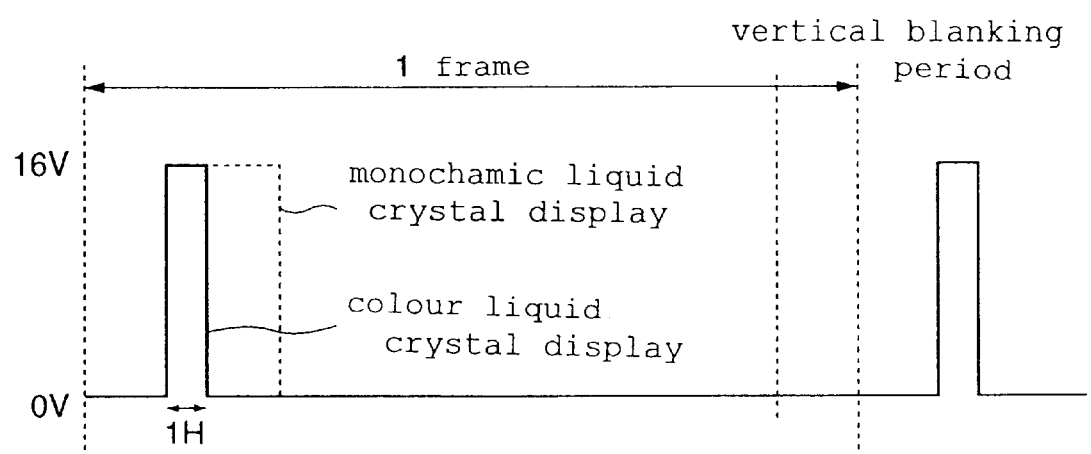
FIG. 21 is a diagram illustrating the waveform of the voltage applied to the gate bus lines of the color liquid crystal display device.

In the case of the liquid crystal display device of the VGA type, the number of drain bus lines is 640 and that of gate bus lines 480×3. In the color liquid crystal display device, therefore, the duration of application of the voltage to one gate bus line 104 during the life of one frame of image is ⅓ of that of the monochromic liquid crystal display device as illustrated in FIG. 21.

Figure 22A:
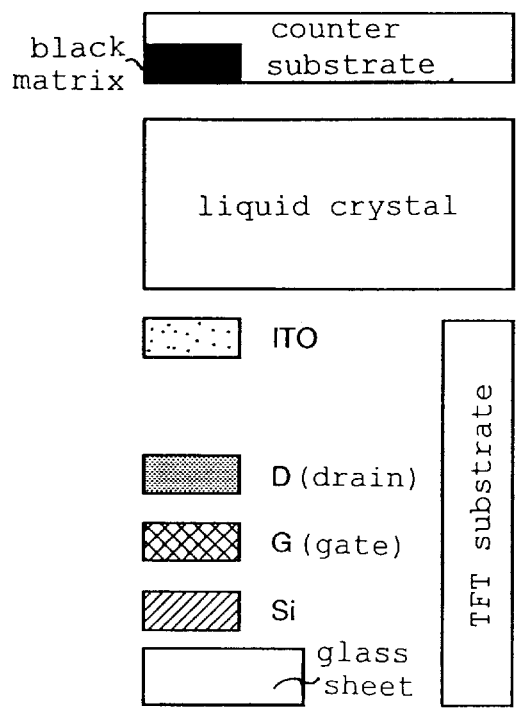
FIG. 22A is a diagram illustrating a layer structure having a black matrix formed on the counter substrate side, FIG. 22B a layer structure having a black matrix formed on the TFT substrate side, and FIG. 22C layer structure having black matrixes formed on both the TFT substrate side and the counter substrate side.
Figure 22B:
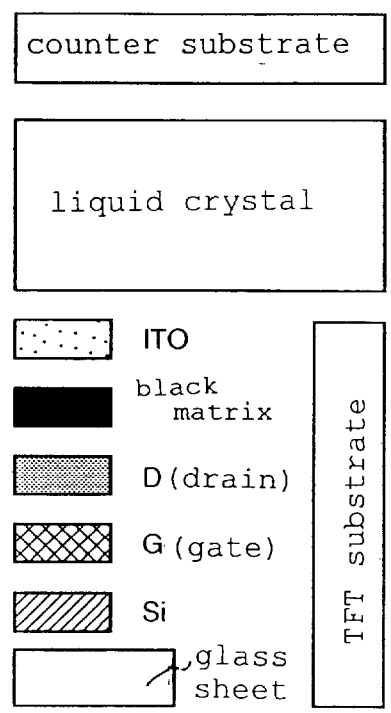
Figure 22C:
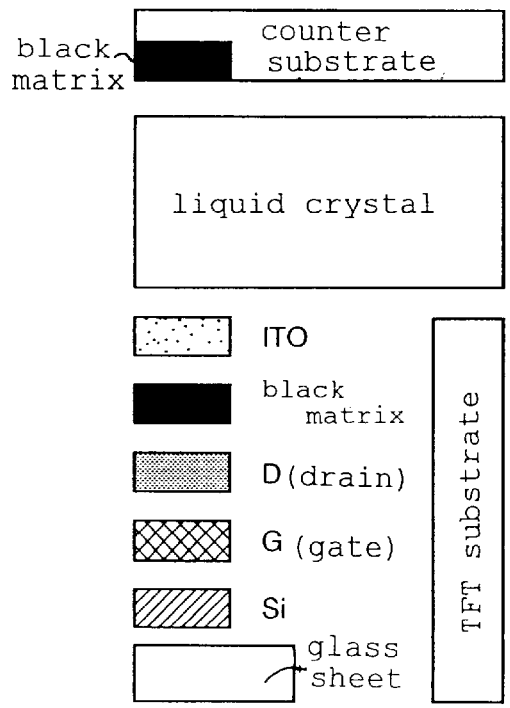

Though the fourth embodiment, as depicted above, interposes the black matrix 108 between the drain bus line 106 and the pixel electrode 110, this invention does not preclude use of other proper position for the black matrix 108. FIG. 22 is a schematic diagram illustrating the layer structure of the liquid crystal display device. The black matrix may be formed on the counter substrate side as illustrated in FIG. 22 (A0 or on the TFT substrate side as illustrated in FIG. 22B. Alternatively, the black matrixes may be formed on both the TFT substrate side and the counter substrate side. When the black matrix is formed on the TFT substrate side, for example, this black matrix and the insulating film may be formed on the glass sheet 104 and the silicon film 102, etc. may be formed thereon.

Further, the fourth embodiment, as depicted above, adopts a structure in which a capacitor composed of the capacitor electrode 106*a* and the gate bus line 104 is connected to the pixel electrode 110. This embodiment, similarly in the first embodiment, may use a structure having the capacitor connected between adjacent TFT's instead.

Though the fourth embodiment, as depicted above, adopts the liquid crystal display device having the silicon film 102 thereof provided on the under side of the gate bus line 104 with a staggered TFT, this invention may be embodied in a liquid crystal display device which is provided with a reversed staggered TFT or a coplanar type TFT. For example, the effect of the fourth embodiment mentioned above can be obtained likewise by disposing the capacitor electrode above or below the gate bus line and forming this capacitor electrode simultaneously with the drain bus line.

(Fifth Embodiment)

Figure 23:
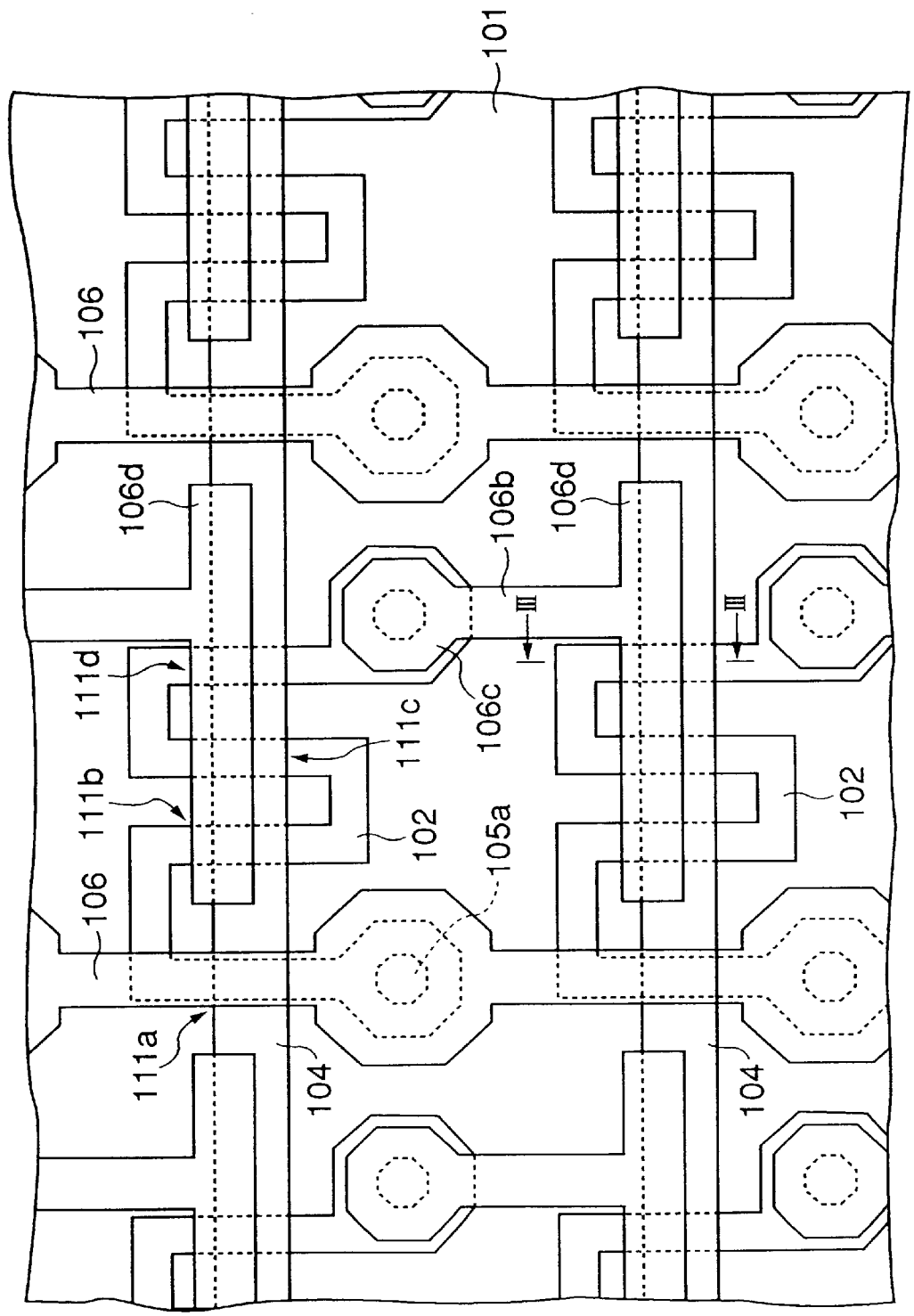
FIG. 23 is a plan view illustrating the TFT substrate in a liquid crystal display device according to the fifth embodiment of the is invention.
Figure 24:
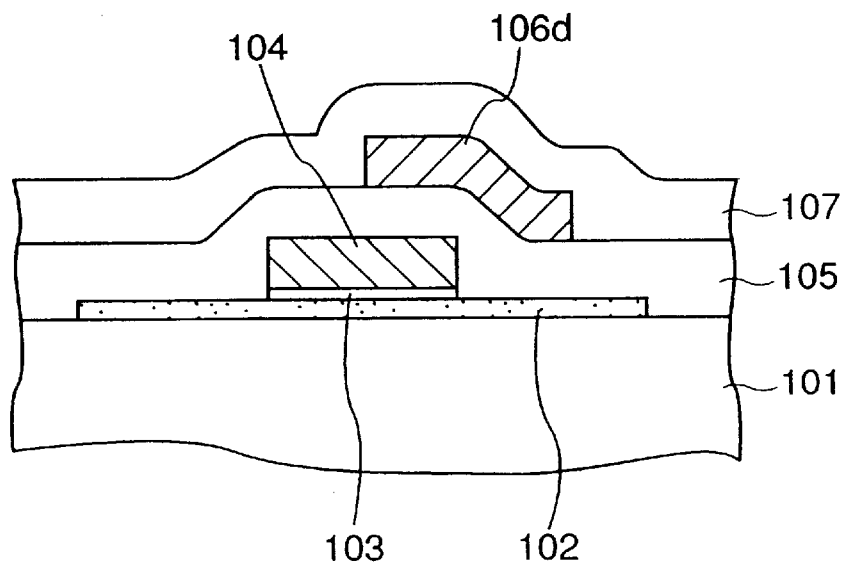
FIG. 24 is a cross section taken through FIG. 23 along the line III—III.

FIG. 23 is a plan view illustrating the TFT substrate of a liquid crystal display device according to the fifth embodiment of this invention and FIG. 24 is a cross section taken through FIG. 23 along the line III—III. In FIG. 23, like parts found in FIG. 17 are denoted by like reference numerals and are omitted from the detailed description that follows.

Figure 25:
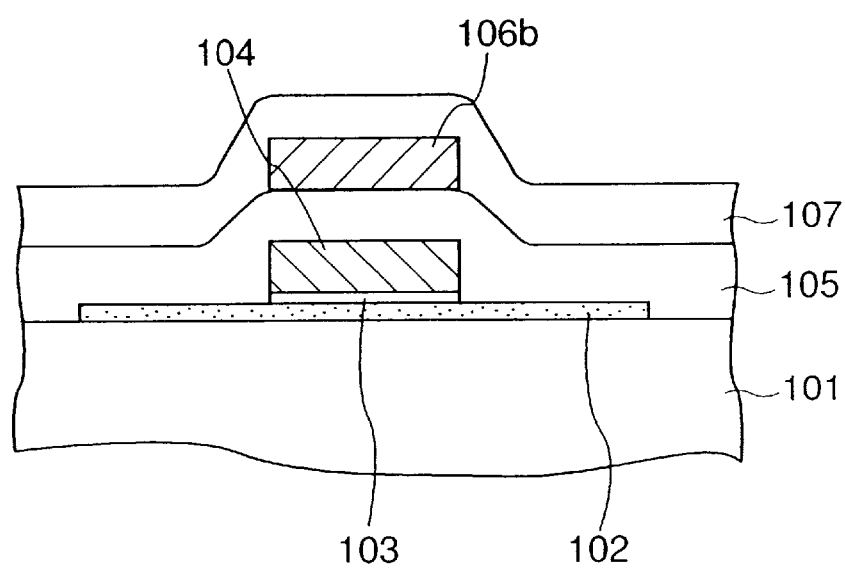
FIG. 25 is a cross section illustrating a case of perfect superposition of a capacitor electrode and a gate bus line.

In the present embodiment, the capacitor electrode 106*d* protrudes laterally from the gate bus line 104. When the capacitor electrode 106*d* and the gate electrode 104 overlap as illustrated in FIG. 17, a large step is formed in the insulating film 107 as illustrated in the cross section of FIG. 25. When the capacitor electrode 106*d* is so disposed as to protrude slightly in the lateral direction from the gate bus line 104 as in the present embodiment, the formation of a large step in the insulating film 107 can be avoided as illustrated in FIG. 24. The occurrence of such inconveniences as the disconnection of the pixel electrode, therefore, can be precluded.

Figure 26A:
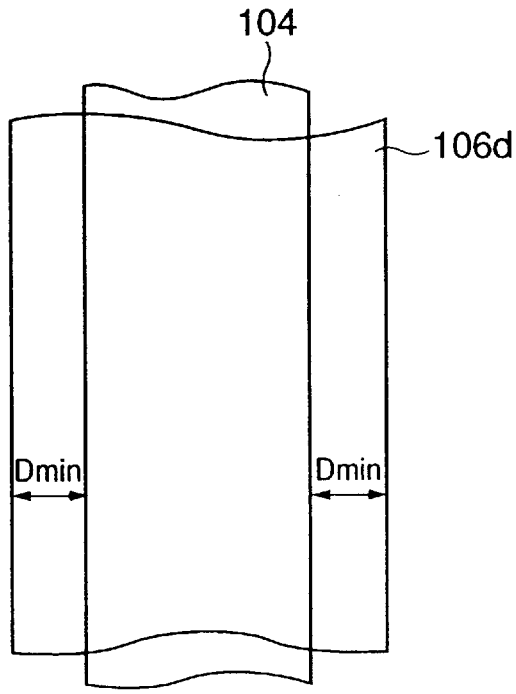
FIG. 26A is a plan view illustrating a case of a capacitor having a larger width than a gate bus line, FIG. 26B a case of a capacitor electrode having a smaller width than a gate bus line, FIG. 26C a case of a capacitor electrode thrust out of one side of a gate bus line, and FIG. 26D a case of a capacitor electrode thrust out of the other side of the gate bus line.
Figure 26B:
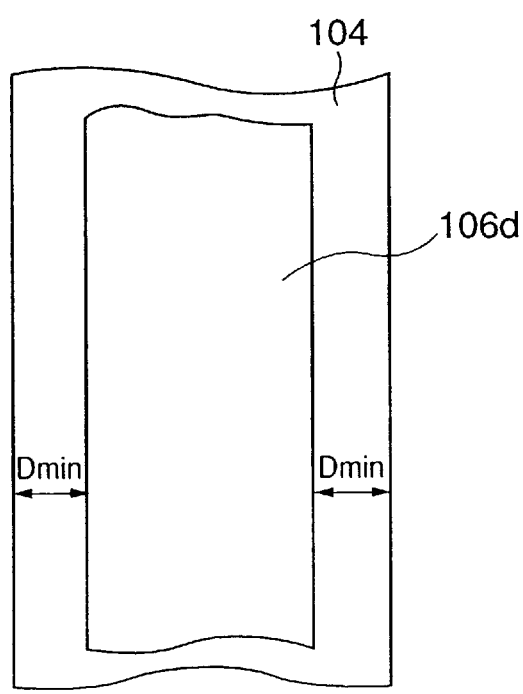
Figure 26C:
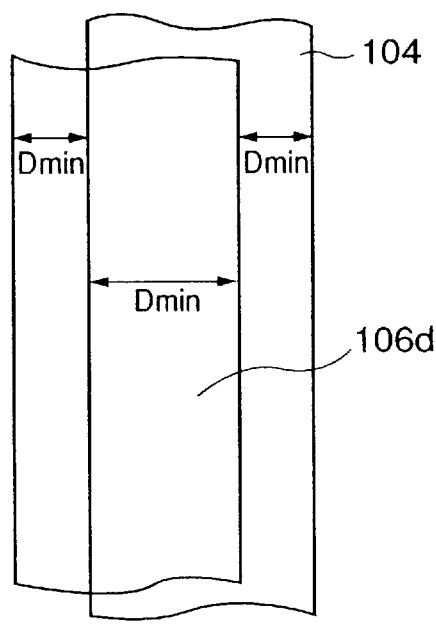
Figure 26D:
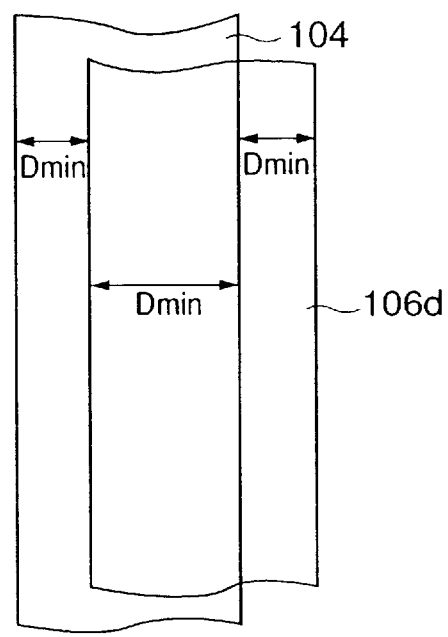

FIG. 26A–FIG. 26D are top views illustrating different manners in which the capacitor electrode 106*d* and the gate bus line 104 are made to overlap. Let Dmin stand for the minimum distance guaranteed for superposition (accuracy in photolithography), and the width of the capacitor electrode 106*d* will be preferred to be not less than 2×Dmin larger than the width of the gate bus line 104 as illustrated in FIG. 26A or the width of the capacitor electrode 106*d* will be preferred to be not less than 2×Dmin smaller than the width of the gate bus line 104 as illustrated in FIG. 26B. Further, the capacitor electrode 106*d* may be formed so as to protrude from the gate bus line 104 on either of the opposite sides thereof as illustrated in FIG. 26C and FIG. 26D. In this case, the distance between the edge of the gate bus line 104 and the edge of the capacitor electrode 106*d* is preferred to be not less than Dmin.

(Sixth Embodiment)

Figure 27:
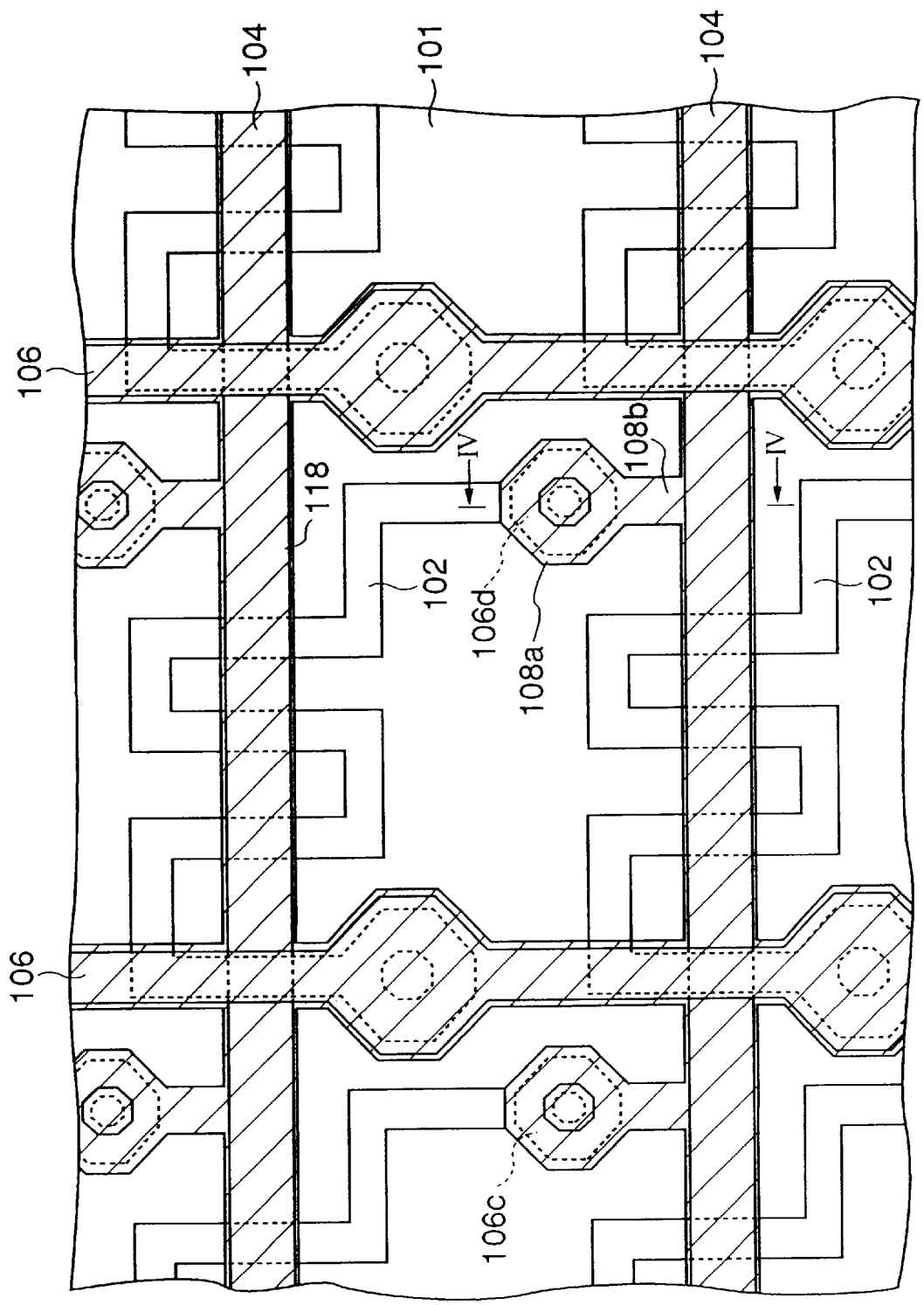
FIG. 27 is a plan view illustrating a liquid crystal display device according to the sixth embodiment of this invention.
Figure 28:
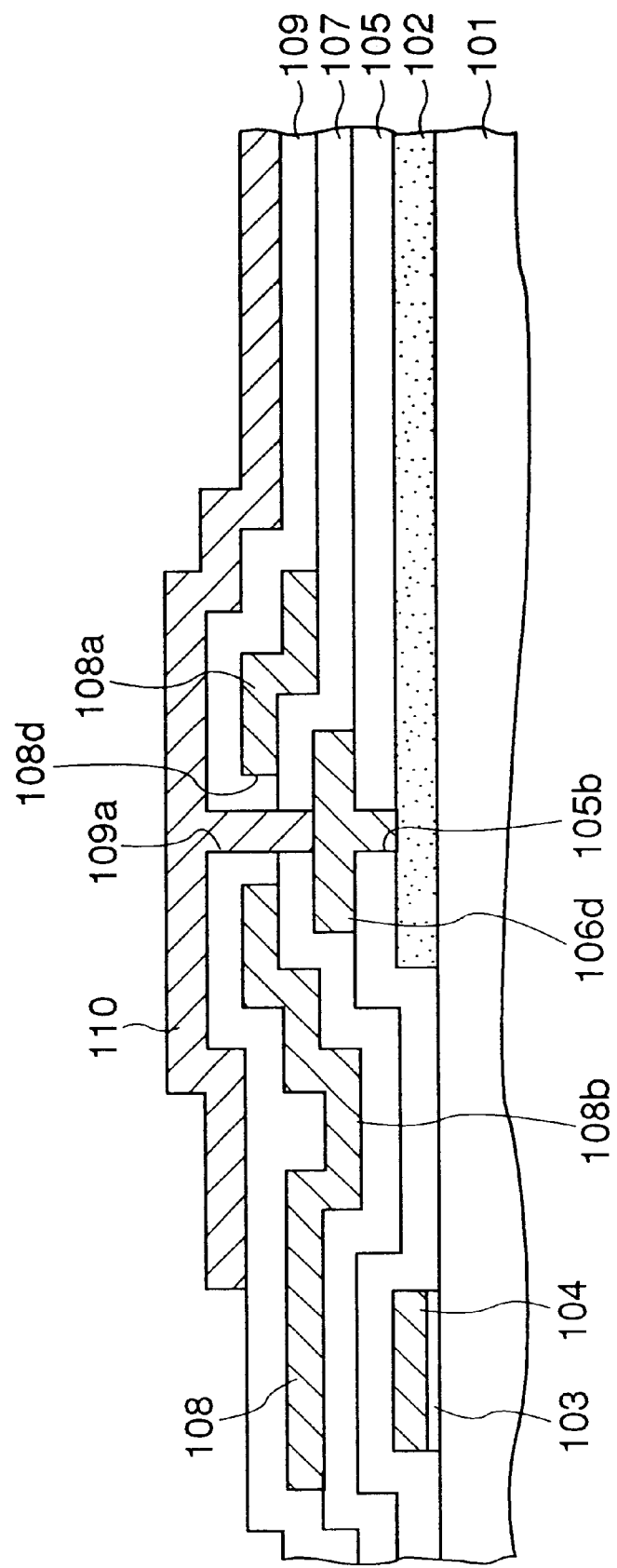
FIG. 28 is a cross section taken through FIG. 17 alone the line IV—IV.
Figure 29:
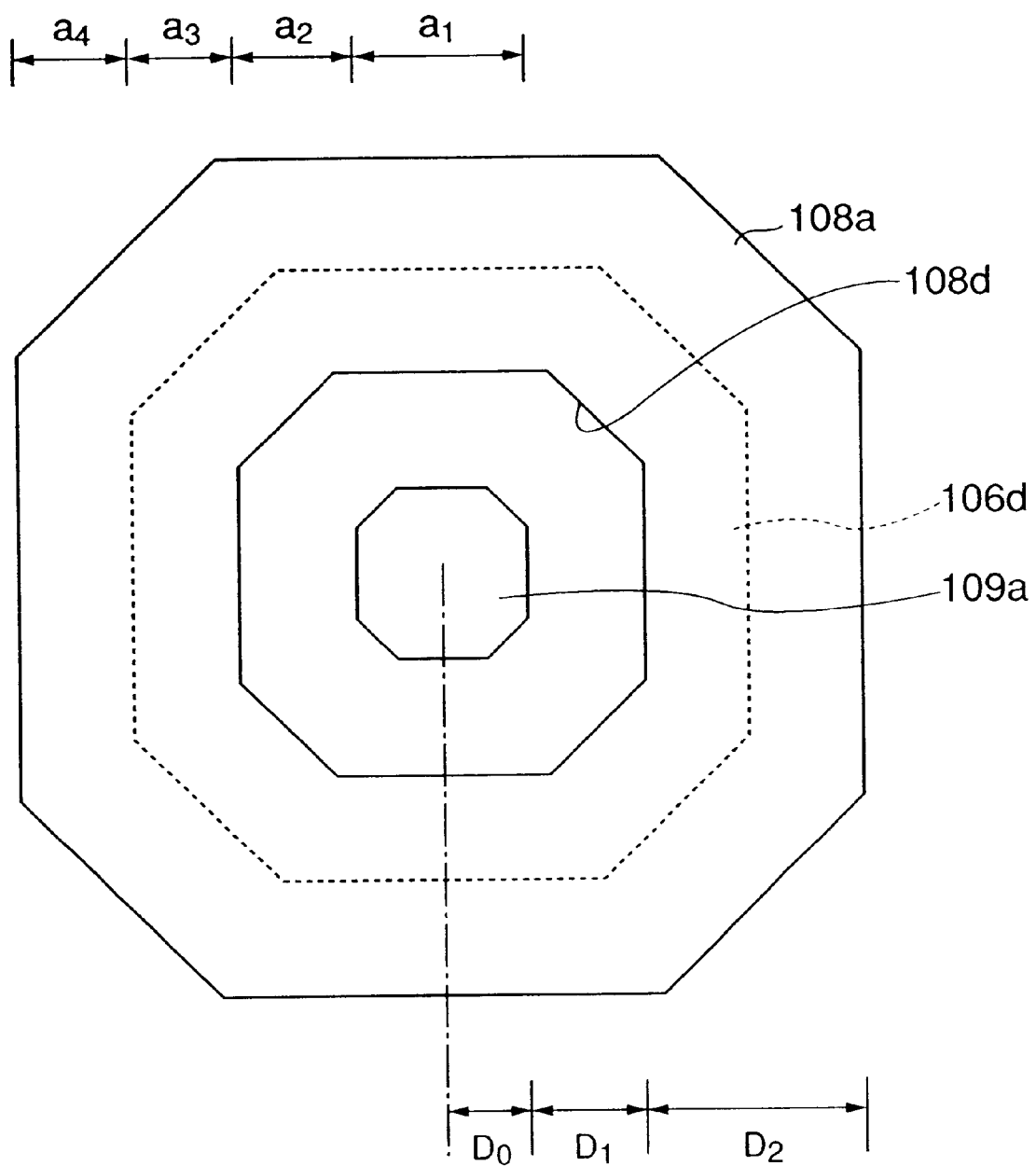
FIG. 29 is a magnified view of the contact part between a pixel electrode and a polysilicon film.

FIG. 27 is a plan view illustrating a liquid crystal display device according to the sixth embodiment of this invention, FIG. 28 is a cross section taken through FIG. 27 along the line IV—IV, and FIG. 29 is a magnified view of the contact part of the pixel electrode 110 and the polysilicon film 102. The hatched part appearing in FIG. 27 represents the black matrix 108.

The polysilicon films 102 and the gate bus lines 104 are formed on the glass sheet 101. The gate bus lines 104 are disposed parallelly to each other and the gate insulating film 103 is interposed between the gate bus lines 104 and the polysilicon film 102.

The polysilicon film 102 and the gate bus lines 104 are covered with the insulating film 105 made of $SiO_2$. The drain bus lines 106 and a first capacitor electrode 106*d* are formed on the insulating film 105. The drain bus lines 106 perpendicularly intersect the gate bus lines 104. The first capacitor electrode 106*d* is made of the same material as the drain bus lines 106 simultaneously therewith. This first capacitor electrode 106*d* has an octagonal shape and is disposed above the terminal part of the polysilicon film 102. The first capacity electrode 106*d* is electrically connected to the polysilicon film 102 through the medium of the contact hole 105*b*.

The insulating film 107 is formed on the insulating film 105 and the drain bus lines 106 and the capacitor electrode 106d are covered with the insulating film 107. The black matrix 108, a second capacitor electrode 108a, and a wiring 108b are formed on the insulating film 107. The black matrix 108 overlies the gate bus lines 104 and the drain bus lines 106. The second capacitor electrode 108a is made of the same material (Ti) as the black matrix 108 simultaneously therewith. It is provided at the center thereof with an opening part 108d and has the inside part thereof superposed on the first capacitor electrode 106d. The first capacitor electrode 106d, the second capacitor electrode 108a, and the insulating film interposed therebetween jointly form a capacitor.

The insulating film 109 is formed on the insulating film 107 and the black matrix 108, the second capacitor electrode 108a, and the wiring 108b are covered with the insulating film 109. The pixel electrode 110 made of ITO is formed on the insulating film 109. This pixel electrode 110 is electrically connected to the first capacitor electrode 106d through the medium of a contact hole 109a.

The width, a1, of the contact hole 109 is about 4 μm, the distance, a2, between the contact hole 109a and the second capacitor electrode 108a is about 3 μm, the width, a3, of superposition of the first capacitor electrode 106d and the second capacitor electrode 109a is about 2 μm, and the distance, a4, between the outer edge of the first capacitor electrode 106d and the outer edge of the second capacitor electrode 109a is about 2 μm.

An alignment layer (not shown) is formed on the insulating film 109 and the pixel electrode 110 is covered with this alignment layer.

In the present embodiment, the pixel electrode 110 is connected to the silicon layer 102 through the medium of the first capacitor electrode 106d and the first capacitor electrode 106d functions as a pad. If the first capacitor electrode 106d is absent, the depth of the contact hole between the pixel electrode 110 and the polysilicon film 102 will increase possibly to the extent of inducing disconnection between the pixel electrode 110 and the polysilicon film 102. In the present embodiment, however, the depth of the contact hole is decreased and the disconnection mentioned above is precluded because the first capacitor electrode 106d is provided between the pixel electrode 110 and the polysilicon film 102. Further, since the first capacitor electrode 106d is made of the same material as the drain bus lines 106 simultaneously therewith, the otherwise possible addition to the number of steps is avoided. In this embodiment, the liquid crystal display device exalts the capacitive component between the pixel electrode 110 and the counter electrode and obtains an ideal display property because the capacitor is composed of the first and second capacitor electrodes 106d and 108a.

In the present embodiment, since the second capacitor electrode 108a has a larger size than the first capacitor electrode 106d, the contact part between the pixel electrode 110 and the polysilicon film 102 can be infallibly shielded from light by the second capacitor electrode 108a even when these two electrodes happen to involve displacement during the course of manufacture. In the case of the projection type color liquid crystal display device which is not provided with a black matrix and is compelled to rely on the gate bus lines and the drain bus lines to shield the contact part, since the gate bus lines and the drain bus lines are formed in different layers, the pixels are liable to generate chromatic deviation in the edge part thereof under the influence of the diffraction of light. In the case of the liquid crystal display device of the present embodiment, however, the occurrence of the chromatic deviation can be repressed because the single layers (the black matrix 108 and the second capacitor electrode 108a) are relied on to stop the light.

Let D0 stand for one half of the minimum width of the contact hole 109a which is decided by the design rule, D1 for the minimum distance from the contact hole 109a to the edge part of the second capacitor electrode 108a, and D2 for the minimum distance from the inside edge to the outside edge of the second capacity electrode 108a, and the first capacitor electrode 106d will be preferred to be a circle, D0+D1+D2 in radius, or a polygon that circumscribes the circle. As a result, the connecting part of the polysilicon layer 102 and the pixel electrode 110 is infallibly shielded from light and the shape of the opening is uniformized even when the pattern happens to incur displacement.

(Other Embodiments)

FIG. 30–FIG. 35 are diagrams illustrating other embodiments of this invention. Collectively, FIG. 30–FIG. 35 show the sequence of superposition of a gate layer 114 destined to form gate bus lines and the like therein, a drain layer 116 destined to form drain bus lines and the like therein, and a black matrix layer 118 destined to form black matrixes and the like therein. In these diagrams, like parts found in FIG. 18 are denoted by like reference numerals and omitted from the detailed description.

Figure 30:
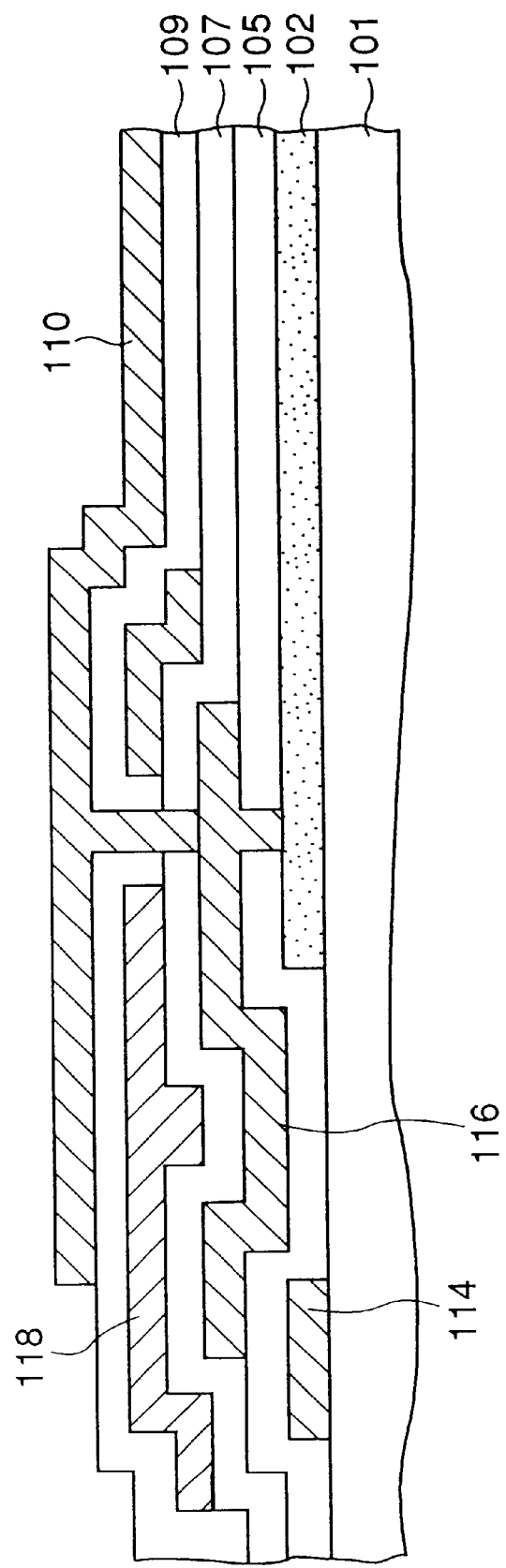
FIG. 30 is a cross section illustrating a layer structure formed by superposing a gate layer, a drain layer, and a black matrix layer sequentially in the order mentioned.

In the structure illustrated in FIG. 30, the gate layer 114, the drain layer 116, and the black matrix layer 118 are formed sequentially in the order mentioned.

In the present embodiment, the capacitive component formed by the overlapping parts of the pixel electrode 110 and the black matrix layer 118, the capacitive component formed by the overlapping parts of the drain layer 116 and the black matrix layer 118, and the capacitive component formed by the overlapping parts of the gate layer 114 and the drain layer 116 may be used as cumulative capacitances to be added to the capacitive component formed by the pixel electrode 110 and the counter electrode.

Figure 31:
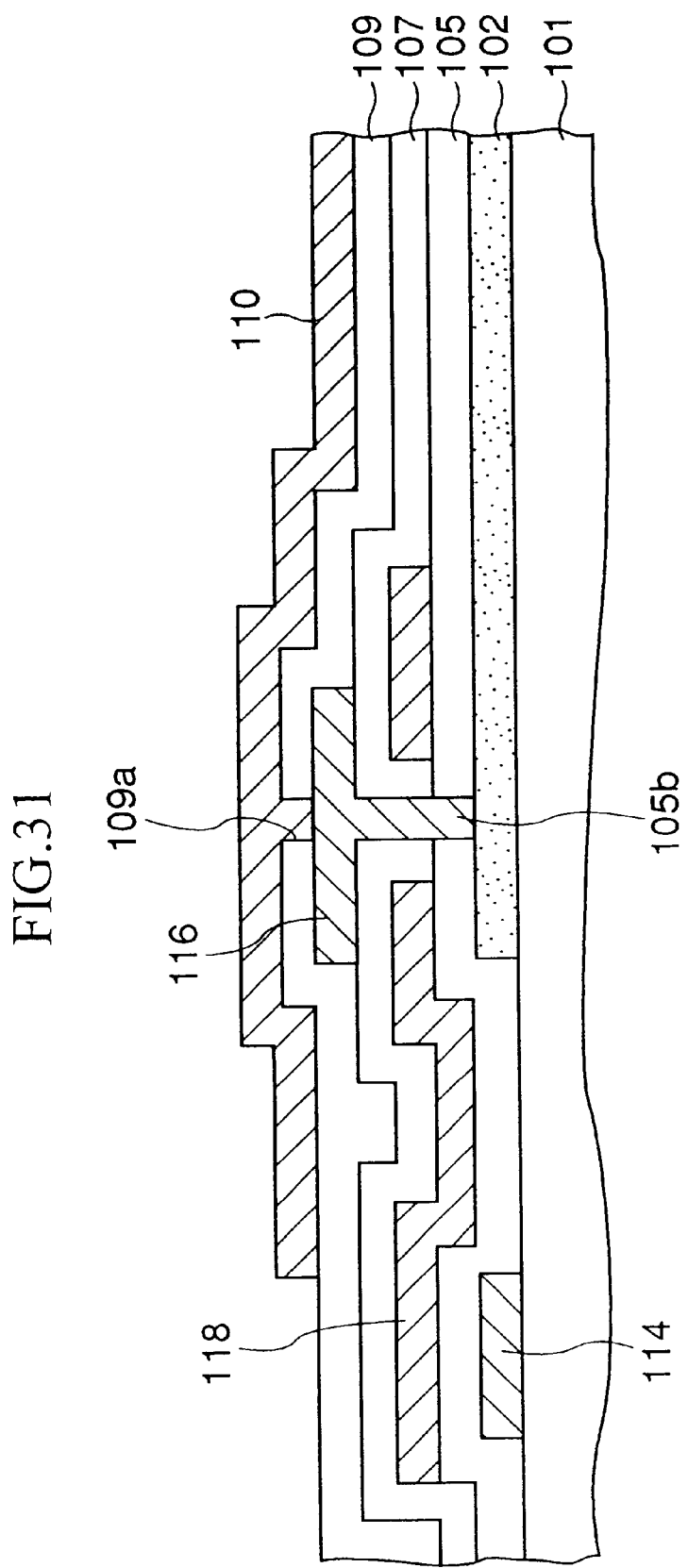
FIG. 31 is a cross section illustrating a layer structure formed by superposing a gate layer, a black matrix layer, and a drain layer sequentially in the order mentioned.

In the structure illustrated in FIG. 31, the gate layer 114, the black matrix layer 118, and the drain layer 116 are formed sequentially in the order mentioned. In the present embodiment, the capacitive component formed by the overlapping parts of the drain layer 116 and the black matrix layer 118 and the capacitive component formed by the overlapping parts of the silicon film 102 and the black matrix layer 118 may be utilized as cumulative capacitances.

Figure 32:
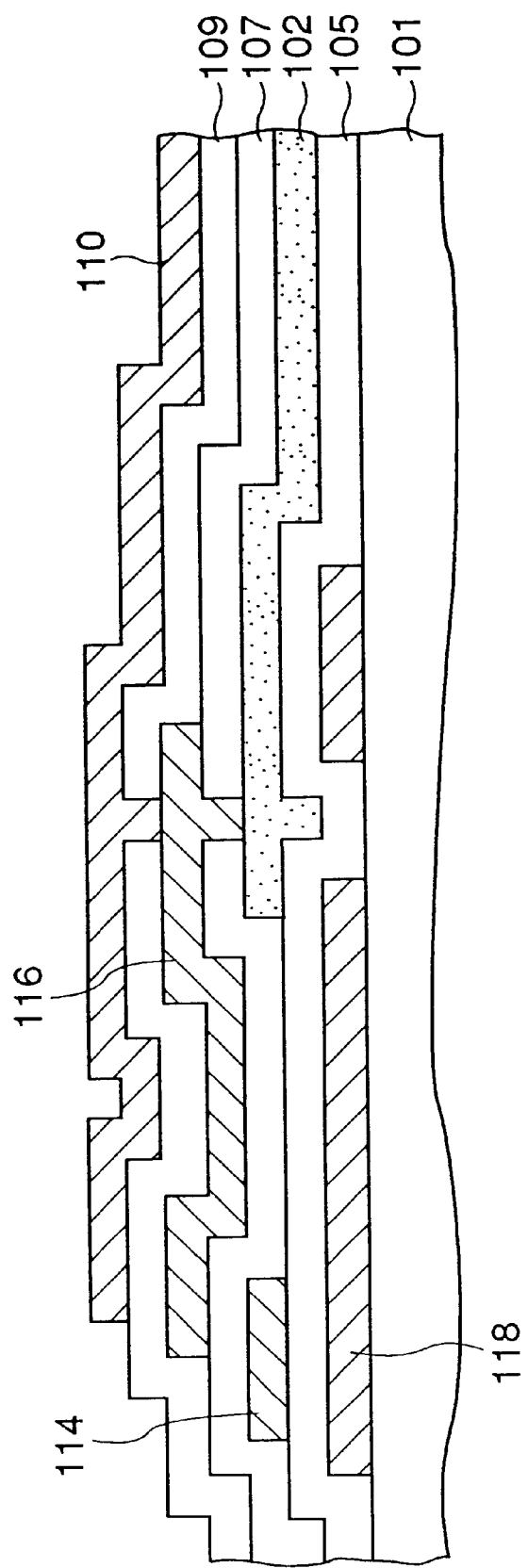
FIG. 32 is a cross section illustrating a layer structure formed by superposing a black matrix layer, a gate layer, and a drain layer sequentially in the order mentioned.

In the structure illustrated in FIG. 32, the black matrix layer 118, the gate layer 114, and the drain layer 116 are formed sequentially in the order mentioned. In the present embodiment, the capacitive component formed by the overlapping parts of the silicon film 102 and the black matrix layer 118 and the capacitive component formed by the overlapping parts of the gate layer 114 and the drain layer 116 may be utilized as cumulative capacitances.

The structures illustrated in FIG. 30–FIG. 32 can be applied to the liquid crystal display devices which are provided with the coplanar type and the reversed staggered type TFT.

Figure 33:
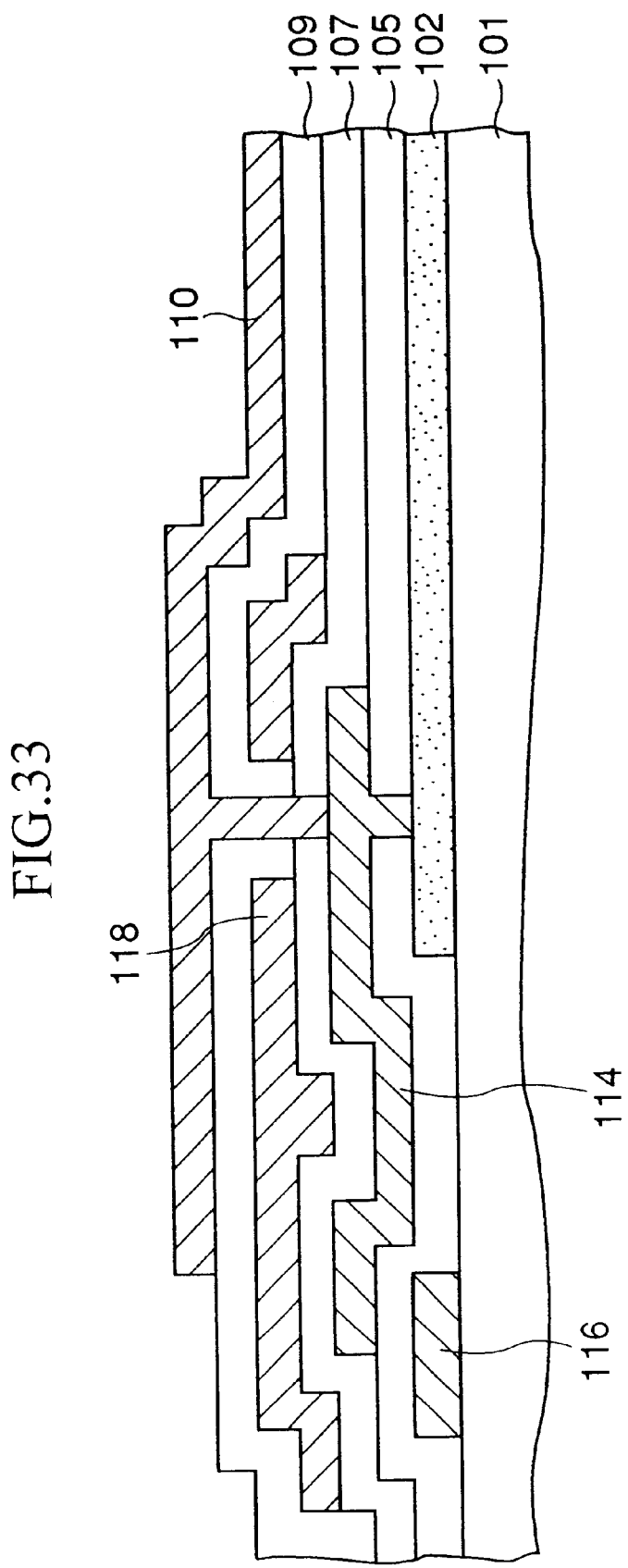
FIG. 33 is a cross section illustrating a layer structure formed by superposing a drain layer, a gate layer, and a black matrix layer sequentially in the order mentioned.

In the structure illustrated in FIG. 33, the drain layer 116, the gate layer 114, and the black matrix layer 118 are formed sequentially in the order mentioned. In the present embodiment, the capacitive component formed by the overlapping parts of the pixel electrode 110 and the black matrix layer 118, the capacitive component formed by the overlapping parts of the gate layer 114 and the black matrix layer 118, and the capacitive component formed by the overlapping parts of the gate layer 114 and the drain layer 116 may be utilized as cumulative capacitances.

Figure 34:
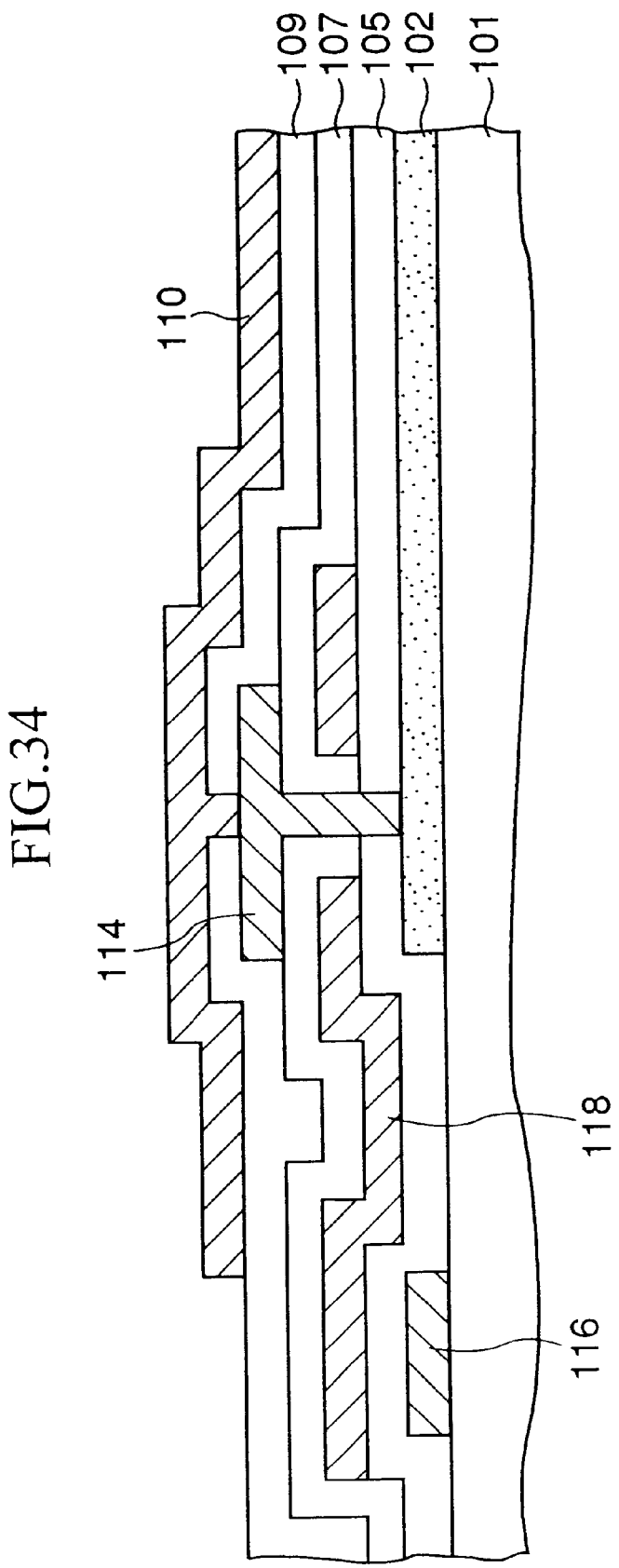
FIG. 34 is a cross section illustrating a layer structure formed by superposing a drain layer, a black matrix layer, and a gate layer sequentially in the order mentioned.
Figure 35:
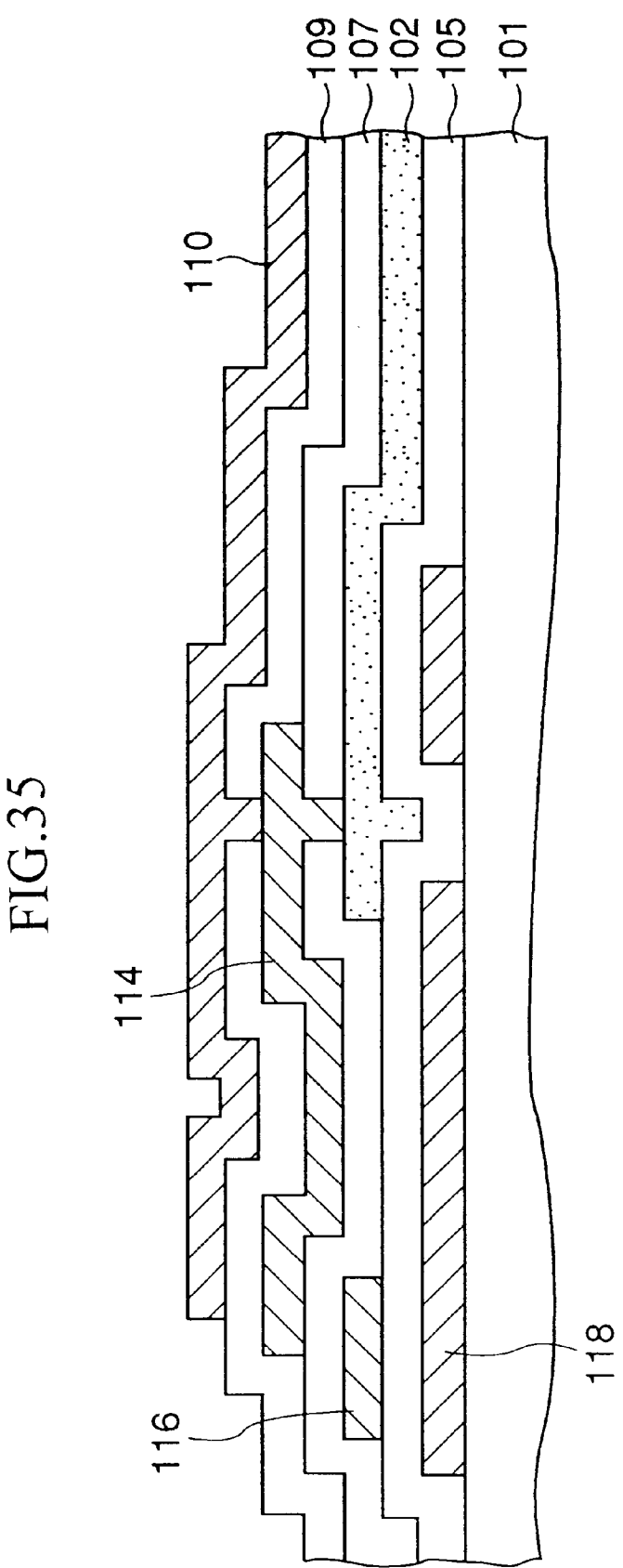
FIG. 35 is a cross section illustrating a layer structure formed by superposing a black matrix layer, a drain layer, a gate layer sequentially in the order mentioned.

In the structure illustrated in FIG. 34, the drain layer 116, the black matrix layer 118, and the gate layer 114 are formed sequentially in the order mentioned. In the present embodiment, the capacitive component formed by the overlapping parts of the gate layer 114 and the black matrix layer 118 and the capacitive component formed by the overlapping parts of the silicon layer 102 and the black matrix layer may be utilized as cumulative capacitances.

In the structure illustrated in FIG. 36, the black matrix layer 118, the drain layer 116, and the gate layer 114 are formed sequentially in the order mentioned. In the present embodiment, the capacitive component formed by the overlapping parts of the silicon film 102 and the black matrix layer 118 and the capacitive component interposed between the gate layer 114 and the drain layer 116 may be utilized as cumulative capacitances.

What is claimed is:

1. A liquid crystal display device, comprising:
    (a) a first substrate being provided including
        (1) a first transparent sheet,
        (2) a plurality of gate bus lines disposed parallel to each other on said first transparent sheet,
        (3) a plurality of drain bus lines formed on said first transparent sheet and adapted to intersect perpendicularly said gate bus lines a second substrate opposed to said first substrate, and a liquid crystal sealed in the gap between said first substrate and said second substrate,
        (4) pixel electrodes disposed severally in areas formed on said first transparent sheet as defined by said gate bus lines and said drain bus lines,
        (5) a plurality of thin film transistors connected in series between said pixel electrodes and said drain bus lines and adapted to utilize said gate bus lines as gate electrodes,
        (6) a first electrode connected electrically to any of connecting parts of sources and drains of said plurality of thin film transistors,
        (7) an interlayer insulating film covering said thin film transistors and said first electrode,
        (8) a second electrode made of a light blocking metal film and opposed to said first electrode on said interlayer insulating film, and
        (9) a black matrix formed to overlie channel parts and the source and drain connecting parts of said plurality of thin film transistors;
    (b) a second substrate opposed to said first substrate and being provided including
        (1) a second transparent sheet, and
        (2) a counter electrode made of a transparent conductor and formed on said second transparent sheet; and
    (c) a liquid crystal sealed in the gap between said first substrate and said second substrate.

2. A liquid crystal display device according to claim 1, wherein said first electrode is connected to the source and drain connecting parts of said plurality of thin film transistors.

3. A liquid crystal display device according to claim 1, wherein said first electrode is connected to the drain sides of thin film transistors which are connected to said pixel electrodes.

4. A liquid crystal display device according to claim 1, wherein said second electrode is retained at a fixed potential relative to the voltage applied to said liquid crystal.

5. A liquid crystal display device comprising:
    (a) a first substrate being provided including
        (1) a first transparent sheet,
        (2) a plurality of gate bus lines disposed parallel to each other on said first transparent sheet,
        (3) a plurality of drain bus lines formed on said first transparent sheet and adapted to intersect perpendicularly said gate bus lines,
        (4) pixel electrodes disposed severally in areas formed on said first transparent sheet as defined by said gate bus lines and said drain bus lines,
        (5) a plurality of thin film transistors connected in series between said pixel electrodes and said drain bus lines and adapted to utilize said gate bus lines as gate electrodes,
        (6) a first electrode made of a metal and connected electrically to any of sources of said plurality of thin film transistors, and
        (7) a second electrode made of a metal film and disposed above or below said first electrode through the medium of an insulating film;
    (b) a second substrate opposed to said first substrate and being provided including
        (1) a second transparent sheet,
        (2) a light blocking metal film covering said gate bus lines and said drain bus lines of said first substrate, and
        (3) a counter electrode formed above or below said light blocking metal film through the medium of an insulating film; and
    (c) a liquid crystal sealed in the gap between said first substrate and said second substrate.

6. A liquid crystal display device according to claim 5, which further comprises an intermediate electrode formed in the same layer as said drain bus lines and is characterized by said pixel electrode being connected to said thin film transistors through the medium of said intermediate electrode.

7. A liquid crystal display device according to claim 5, wherein said first electrode is formed in either of the layer having said gate bus lines formed therein and the layer having said drain bus lines formed therein and said second electrode is formed in the remainder of said two layers.

8. A liquid crystal display device according to claim 5, wherein the areas defined by said gate bus lines and said drain bus lines are utilized as pixel areas and the size, x, of said pixel areas in the direction of length of said gate bus lines and the size, y, of said pixel areas in the direction of length of said drain bus lines satisfy the expression, $x>y$.

9. A liquid crystal display device according to claim 8, wherein three adjacent pixel areas lying in the direction of length of said drain bus lines are utilized as one dot during color display and a red (R) color filter is allocated to one of said three pixel areas, a green (G) color filter is allocated to either of the other two pixel areas, and a blue (B) color filter is allocated to the remaining pixel area.

10. A liquid crystal display device comprising;
    (a) a first substrate being provided including
        (1) a first transparent sheet,
        (2) a plurality of gate bus lines disposed parallel to each other on said first transparent sheet,
        (3) a plurality of drain bus lines formed on said first transparent sheet and adapted to intersect perpendicularly said gate bus lines,
        (4) pixel electrodes disposed severally in areas formed on said first transparent sheet as defined by said gate bus lines and said drain bus lines,
        (5) a plurality of thin film transistors connected in series between said pixel electrodes and said drain bus lines and adapted to utilize said gate bus lines as gate electrodes, (6) a light blocking metal film covering at least said gate bus lines and said drain bus lines, (7) a first electrode made of a metal and connected electrically to any of sources of said plurality of thin film transistors, and (8) a second electrode made of a metal film and disposed above or below said first electrode through the medium of an insulating film;

(b) a second substrate opposed to said first substrate and being provided including (1) a second transparent sheet, and (2) a counter electrode made of a transparent conductor and formed on said second transparent sheet; and (c) a liquid crystal sealed in the gap between said first substrate and said second substrate.

11. A liquid crystal display device according to claim 10, which further comprises an intermediate electrode formed in the same layer as said drain bus lines and is characterized by said pixel electrodes being connected to said thin film transistors through the medium of said intermediate electrode.

12. A liquid crystal display device according to claim 10, wherein said first electrode is formed in any of the three layers, the layer having said gate bus lines formed therein, the layer having said drain bus lines formed therein, and the layer having said light blocking metal film formed therein and said second electrode is formed in either of the remaining two layers.

13. A liquid crystal display device according to claim 10, wherein the areas defined by said gate bus lines and said drain bus lines are utilized as pixel areas and the size, x, of said pixel areas in the direction of length of said gate bus lines and the size, y, of said pixel areas in the direction of length of said drain bus lines satisfy the expression, x>y.

14. A liquid crystal display device according to claim 13, wherein three adjacent pixel areas lying in the direction of length of said drain bus lines are utilized as one dot during color display and a red (R) color filter is allocated to one of said three pixel areas, a green (G) color filter is allocated to either of the other two pixel areas, and a blue (B) color filter is allocated to the remaining pixel area.

15. A process for the production of a liquid crystal display device, characterized by comprising;

(a) a step of selectively forming a silicon film on a transparent sheet;

(b) a step of forming a gate insulating film on said silicon film;

(c) a step of forming gate bus lines passing said gate insulating film on said transparent sheet;

(d) a step of selectively introducing an impurity into said silicon film thereby forming a plurality of thin film transistors formed of said silicon film, said gate insulating film, and said gate bus lines and connected in series;

(e) a step of forming a first interlayer insulating film covering said thin film transistors on the entire face of said transparent sheet;

(f) a step of selectively forming a first and a second contact hole in said first interlayer insulating film;

(g) a step of forming a conducting film on said first interlayer insulating film and patterning said conductor film thereby forming drain bus lines electrically connected to the transistor on one terminal side in all said plurality of thin film transistors connected in series through the medium of said first contact hole and a first electrode electrically connected to any of connecting parts of sources and drains of said plurality of thin film transistors through the medium of said second contact hole;

(h) a step of forming a second interlayer insulating film covering said drain bus lines and said first electrode on the entire face of said transparent sheet; and (i) a step of forming a light blocking metal film on said second interlayer insulating film and patterning said light blocking metal film thereby forming a black matrix covering said gate bus lines and said drain bus lines and a second electrode overlying said first electrode.

* * * * *